(12) United States Patent
Habibi et al.

(10) Patent No.: US 10,266,119 B2
(45) Date of Patent: Apr. 23, 2019

(54) INTERIOR REARVIEW MIRROR SYSTEM FOR VEHICLE

(71) Applicant: MAGNA MIRRORS OF AMERICA, INC., Holland, MI (US)

(72) Inventors: Hamid Habibi, Holland, MI (US); Michael J. Baur, Holland, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 279 days.

(21) Appl. No.: 14/960,835

(22) Filed: Dec. 7, 2015

(65) Prior Publication Data

US 2016/0082890 A1 Mar. 24, 2016

Related U.S. Application Data

(63) Continuation of application No. 13/020,110, filed on Feb. 3, 2011, now Pat. No. 9,205,780.

(Continued)

(51) Int. Cl.
*G02B 17/00* (2006.01)
*B60R 1/08* (2006.01)
(Continued)

(52) U.S. Cl.
CPC ............ *B60R 1/088* (2013.01); *B60R 1/08* (2013.01); *B60R 1/087* (2013.01); *G02B 17/00* (2013.01);
(Continued)

(58) Field of Classification Search
CPC ......... G02B 17/00; G02B 17/04; G02F 1/157; G02F 1/153; B60R 1/08; B60R 1/088; B60R 1/087
See application file for complete search history.

(56) References Cited

U.S. PATENT DOCUMENTS 2,263,382 A  11/1941  Godzinger
2,580,014 A  12/1951  Gazda
(Continued)

FOREIGN PATENT DOCUMENTS

EP  0356099  2/1990
EP  1176056  1/2002
(Continued)

OTHER PUBLICATIONS

Hicks et al., "Panoramic Electronic Rear Vision for Automotive Applications", SAE Technical Paper Series, published Mar. 1, 1999.

*Primary Examiner* — Thong Q Nguyen
(74) *Attorney, Agent, or Firm* — Honigman LLP

(57) ABSTRACT

An interior rearview mirror system for a vehicle includes an interior rearview mirror assembly having a mirror head with a mirror reflective element. The mirror reflective element includes a transflective mirror reflector. A video display screen is disposed behind the mirror reflective element and is operable for displaying video images viewable through the transflective mirror reflector of the mirror reflective element. When not operated to display video images, the presence of the video display screen behind the mirror reflective element is rendered covert by the transflective mirror reflector. The interior rearview mirror assembly includes a mechanism operable to change the orientation of the mirror reflective element relative to the vehicle driver. The mechanism operates to flip the orientation of the mirror reflective element between a first position that is tilted towards the vehicle driver and a second position that is tilted away from the vehicle driver.

37 Claims, 9 Drawing Sheets

Related U.S. Application Data

(60) Provisional application No. 61/301,417, filed on Feb. 4, 2010.

(51) Int. Cl.
*G02F 1/157* (2006.01)
*G02B 17/04* (2006.01)
*G02F 1/153* (2006.01)
*H04N 7/18* (2006.01)

(52) U.S. Cl.
CPC ............. *G02B 17/04* (2013.01); *G02F 1/153* (2013.01); *G02F 1/157* (2013.01); *H04N 7/18* (2013.01)

(56) References Cited

U.S. PATENT DOCUMENTS

| | | |
|---|---|---|
| 3,266,016 A | 8/1966 | Maruyama et al. |
| 3,280,701 A | 10/1966 | Donnelly et al. |
| 3,806,229 A | 4/1974 | Schoot et al. |
| 4,435,042 A | 3/1984 | Wood et al. |
| 4,436,371 A | 3/1984 | Wood et al. |
| 4,499,451 A | 2/1985 | Suzuki et al. |
| 4,588,267 A | 5/1986 | Pastore |
| 4,623,222 A | 11/1986 | Itoh et al. |
| 4,630,904 A | 12/1986 | Pastore |
| 4,676,001 A | 6/1987 | Wagner |
| 4,679,906 A | 7/1987 | Brandenburg |
| 4,712,879 A | 12/1987 | Lynam et al. |
| 4,721,364 A | 1/1988 | Itoh et al. |
| 4,761,061 A | 8/1988 | Nishiyama et al. |
| 4,764,410 A | 8/1988 | Grzywinski |
| 4,766,023 A | 8/1988 | Lu |
| 4,773,740 A | 9/1988 | Kawakami et al. |
| 4,793,690 A | 12/1988 | Gahan et al. |
| 4,799,768 A | 1/1989 | Gahan |
| 4,824,221 A | 4/1989 | Endo et al. |
| 4,826,289 A | 5/1989 | Vandenbrink et al. |
| 4,832,467 A | 5/1989 | Miyagi et al. |
| 4,852,979 A | 8/1989 | Agrawal |
| 4,878,743 A | 11/1989 | Aikawa et al. |
| 4,882,466 A | 11/1989 | Friel |
| 4,882,565 A | 11/1989 | Gallmeyer |
| 4,906,075 A | 3/1990 | Matsumiya |
| 4,906,085 A | 3/1990 | Sugihara et al. |
| 4,927,246 A | 5/1990 | Ito et al. |
| 4,936,533 A | 6/1990 | Adams et al. |
| 4,948,242 A | 8/1990 | Desmond et al. |
| 5,014,167 A | 5/1991 | Roberts |
| 5,066,112 A | 11/1991 | Lynam et al. |
| 5,073,012 A | 12/1991 | Lynam |
| 5,076,673 A | 12/1991 | Lynam et al. |
| 5,078,480 A | 1/1992 | Warszawski |
| 5,100,095 A | 3/1992 | Haan et al. |
| 5,115,346 A | 5/1992 | Lynam |
| 5,140,455 A | 8/1992 | Varaprasad et al. |
| 5,142,406 A | 8/1992 | Lampert et al. |
| 5,142,407 A | 8/1992 | Varaprasad et al. |
| 5,151,816 A | 9/1992 | Varaprasad et al. |
| 5,151,824 A | 9/1992 | O'Farrell |
| 5,178,448 A | 1/1993 | Adams et al. |
| 5,179,471 A | 1/1993 | Caskey et al. |
| 5,183,099 A | 2/1993 | Bechu |
| 5,189,537 A | 2/1993 | O'Farrell |
| 5,193,029 A | 3/1993 | Schofield et al. |
| 5,202,787 A | 4/1993 | Byker et al. |
| 5,207,492 A | 5/1993 | Roberts |
| 5,233,461 A | 8/1993 | Dornan et al. |
| 5,253,109 A | 10/1993 | O'Farrell et al. |
| 5,254,388 A | 10/1993 | Melby et al. |
| 5,285,060 A | 2/1994 | Larson et al. |
| 5,303,322 A | 4/1994 | Winston et al. |
| 5,313,335 A | 5/1994 | Gray et al. |
| 5,327,288 A | 7/1994 | Wellington et al. |
| 5,354,965 A | 10/1994 | Lee |
| 5,355,245 A | 10/1994 | Lynam |
| 5,406,414 A | 4/1995 | O'Farrell et al. |
| 5,437,931 A | 8/1995 | Tsai et al. |
| 5,442,478 A | 8/1995 | Lampert et al. |
| 5,446,576 A | 8/1995 | Lynam et al. |
| 5,448,397 A | 9/1995 | Tonar |
| 5,481,409 A | 1/1996 | Roberts |
| 5,509,606 A | 4/1996 | Breithaupt et al. |
| 5,523,877 A | 6/1996 | Lynam |
| 5,525,264 A | 6/1996 | Cronin et al. |
| 5,530,240 A | 6/1996 | Larson et al. |
| 5,535,056 A | 7/1996 | Caskey et al. |
| 5,550,677 A | 8/1996 | Schofield et al. |
| 5,555,136 A | 9/1996 | Waldmann et al. |
| 5,567,360 A | 10/1996 | Varaprasad et al. |
| 5,575,552 A | 11/1996 | Faloon et al. |
| 5,582,383 A | 12/1996 | Mertens et al. |
| 5,587,236 A | 12/1996 | Agrawal et al. |
| 5,587,699 A | 12/1996 | Faloon et al. |
| 5,594,222 A | 1/1997 | Caldwell |
| 5,610,756 A | 3/1997 | Lynam et al. |
| 5,649,756 A | 7/1997 | Adams et al. |
| 5,668,663 A | 9/1997 | Varaprasad et al. |
| 5,669,698 A | 9/1997 | Veldman et al. |
| 5,680,263 A | 10/1997 | Zimmermann et al. |
| 5,689,370 A | 11/1997 | Tonar et al. |
| 5,724,187 A | 3/1998 | Varaprasad et al. |
| 5,751,489 A | 5/1998 | Caskey et al. |
| 5,786,772 A | 7/1998 | Schofield et al. |
| 5,788,357 A | 8/1998 | Muth et al. |
| 5,790,298 A | 8/1998 | Tonar |
| 5,808,777 A | 9/1998 | Lynam et al. |
| 5,818,636 A | 10/1998 | Leventis et al. |
| 5,820,097 A | 10/1998 | Spooner |
| 5,877,897 A | 3/1999 | Schofield et al. |
| 5,910,854 A | 6/1999 | Varaprasad et al. |
| 5,922,176 A | 7/1999 | Caskey et al. |
| 5,938,320 A | 8/1999 | Crandall |
| 5,956,181 A | 9/1999 | Lin |
| 5,984,482 A | 11/1999 | Rumsey et al. |
| 6,001,486 A | 12/1999 | Varaprasad et al. |
| 6,002,544 A | 12/1999 | Yatsu |
| 6,005,724 A | 12/1999 | Todd |
| 6,062,920 A | 5/2000 | Jordan et al. |
| 6,064,509 A | 5/2000 | Tonar et al. |
| 6,065,840 A | 5/2000 | Caskey et al. |
| 6,111,684 A | 8/2000 | Forgette et al. |
| 6,111,685 A | 8/2000 | Tench et al. |
| 6,154,306 A | 11/2000 | Varaprasad et al. |
| 6,164,564 A | 12/2000 | Franco et al. |
| 6,166,847 A | 12/2000 | Tench et al. |
| 6,172,613 B1 | 1/2001 | DeLine et al. |
| 6,178,034 B1 | 1/2001 | Allemand et al. |
| 6,196,688 B1 | 3/2001 | Caskey et al. |
| 6,207,083 B1 | 3/2001 | Varaprasad et al. |
| 6,227,675 B1 | 5/2001 | Mertens et al. |
| 6,245,262 B1 | 6/2001 | Varaprasad et al. |
| 6,257,746 B1 | 7/2001 | Todd et al. |
| 6,260,608 B1 | 7/2001 | Kim |
| 6,286,965 B1 | 9/2001 | Caskey et al. |
| 6,297,900 B1 | 10/2001 | Tulloch et al. |
| 6,310,611 B1 | 10/2001 | Caldwell |
| 6,315,421 B1 | 11/2001 | Apfelbeck et al. |
| 6,317,248 B1 | 11/2001 | Agrawal et al. |
| 6,320,282 B1 | 11/2001 | Caldwell |
| 6,329,925 B1 | 12/2001 | Skiver et al. |
| 6,356,376 B1 | 3/2002 | Tonar et al. |
| 6,392,783 B1 | 5/2002 | Lomprey et al. |
| 6,420,036 B1 | 7/2002 | Varaprasad et al. |
| 6,428,172 B1 | 8/2002 | Hutzel et al. |
| 6,441,964 B1 | 8/2002 | Chu et al. |
| 6,449,082 B1 | 9/2002 | Agrawal et al. |
| 6,483,438 B2 | 11/2002 | DeLine et al. |
| 6,501,387 B2 | 12/2002 | Skiver et al. |
| 6,512,624 B2 | 1/2003 | Tonar et al. |
| 6,593,565 B2 | 7/2003 | Heslin et al. |
| 6,595,649 B2 | 7/2003 | Hoekstra et al. |
| 6,615,438 B1 | 9/2003 | Franco et al. |

(56) References Cited

U.S. PATENT DOCUMENTS

| | | |
|---|---|---|
| 6,627,918 B2 | 9/2003 | Getz et al. |
| 6,642,840 B2 | 11/2003 | Lang et al. |
| 6,642,851 B2 | 11/2003 | DeLine et al. |
| 6,648,477 B2 | 11/2003 | Hutzel et al. |
| 6,669,109 B2 | 12/2003 | Ivanov et al. |
| 6,690,268 B2 | 2/2004 | Schofield et al. |
| 6,710,906 B2 | 3/2004 | Guarr et al. |
| 6,719,215 B2 | 4/2004 | Drouillard |
| 6,737,629 B2 | 5/2004 | Nixon et al. |
| 6,742,904 B2 | 6/2004 | Bechtel et al. |
| D493,131 S | 7/2004 | Lawlor et al. |
| D493,394 S | 7/2004 | Lawlor et al. |
| 6,798,556 B2 | 9/2004 | Tench et al. |
| 6,824,281 B2 | 11/2004 | Schofield et al. |
| 6,831,268 B2 | 12/2004 | Bechtel et al. |
| 6,877,709 B2 | 4/2005 | March et al. |
| 7,106,392 B2 | 9/2006 | You |
| 7,184,190 B2 | 2/2007 | McCabe et al. |
| 7,195,381 B2 | 3/2007 | Lynam et al. |
| 7,249,860 B2 | 7/2007 | Kulas et al. |
| 7,255,451 B2 | 8/2007 | McCabe et al. |
| 7,256,923 B2 | 8/2007 | Liu et al. |
| 7,274,501 B2 | 9/2007 | McCabe et al. |
| 7,289,037 B2 | 10/2007 | Uken et al. |
| 7,310,177 B2 | 12/2007 | McCabe et al. |
| 7,310,178 B2 | 12/2007 | Lawlor et al. |
| 7,338,177 B2 | 3/2008 | Lynam |
| 7,355,161 B2 | 4/2008 | Romig et al. |
| 7,360,932 B2 | 4/2008 | Uken et al. |
| 7,370,983 B2 | 5/2008 | DeWind et al. |
| 7,391,563 B2 | 6/2008 | McCabe et al. |
| 7,420,756 B2 | 9/2008 | Lynam |
| 7,490,007 B2 | 2/2009 | Taylor et al. |
| 7,494,231 B2 | 2/2009 | Varaprasad et al. |
| 7,527,403 B2 | 5/2009 | Uken |
| 7,542,193 B2 | 6/2009 | McCabe et al. |
| 7,543,947 B2 | 6/2009 | Varaprasad et al. |
| 7,581,859 B2 | 9/2009 | Lynam |
| 7,626,749 B2 | 12/2009 | Baur et al. |
| 7,633,669 B2 | 12/2009 | Burrell et al. |
| 7,738,155 B2 | 6/2010 | Agrawal et al. |
| 7,813,023 B2 | 10/2010 | Baur |
| 7,855,755 B2 | 12/2010 | Weller et al. |
| 7,898,719 B2 | 3/2011 | Schofield et al. |
| 9,205,780 B2 | 12/2015 | Habibi et al. |
| 2002/0036828 A1 | 3/2002 | Wong |
| 2002/0159270 A1 | 10/2002 | Lynam et al. |
| 2003/0043589 A1 | 3/2003 | Blank |
| 2003/0101749 A1 | 6/2003 | Lingle et al. |
| 2004/0027694 A1 | 2/2004 | Lin |
| 2004/0027695 A1 | 2/2004 | Lin |
| 2004/0032638 A1 | 2/2004 | Tonar et al. |
| 2004/0032675 A1 | 2/2004 | Weller et al. |
| 2004/0032676 A1 | 2/2004 | Drummond et al. |
| 2004/0264011 A1 | 12/2004 | Lynam |
| 2005/0078389 A1 | 4/2005 | Kulas et al. |
| 2005/0083577 A1 | 4/2005 | Varaprasad et al. |
| 2005/0099693 A1 | 5/2005 | Schofield et al. |
| 2005/0134983 A1 | 6/2005 | Lynam |
| 2006/0050018 A1 | 3/2006 | Hutzel et al. |
| 2006/0050356 A1 | 3/2006 | McCabe et al. |
| 2006/0061008 A1 | 3/2006 | Karner et al. |
| 2006/0071766 A1* | 4/2006 | O'Brien .............. B60C 23/0408 340/442 |
| 2006/0126150 A1 | 6/2006 | Tonar et al. |
| 2006/0132939 A1* | 6/2006 | Blank ................. B60R 1/12 359/838 |
| 2006/0285190 A1 | 12/2006 | Agrawal et al. |
| 2007/0279752 A1 | 12/2007 | McCabe et al. |
| 2008/0077882 A1 | 3/2008 | Kramer et al. |
| 2008/0212189 A1 | 9/2008 | Baur et al. |
| 2009/0015736 A1 | 1/2009 | Weller et al. |
| 2009/0243824 A1 | 10/2009 | Peterson et al. |
| 2010/0091394 A1 | 4/2010 | DeWind et al. |
| 2010/0097469 A1 | 4/2010 | Blank et al. |

FOREIGN PATENT DOCUMENTS

| | | |
|---|---|---|
| EP | 2789505 | 10/2014 |
| JP | 362075619 | 4/1987 |
| JP | 2002120649 | 4/2002 |
| JP | 2010143250 | 7/2010 |
| JP | 2010163104 | 7/2010 |
| WO | WO2003084780 | 10/2003 |
| WO | WO2004012963 | 2/2004 |
| WO | WO2004098953 | 11/2004 |
| WO | WO2010111173 | 9/2010 |
| WO | WO2010114825 | 10/2010 |
| WO | WO2010124064 | 10/2010 |
| WO | WO2011044312 | 4/2011 |

* cited by examiner

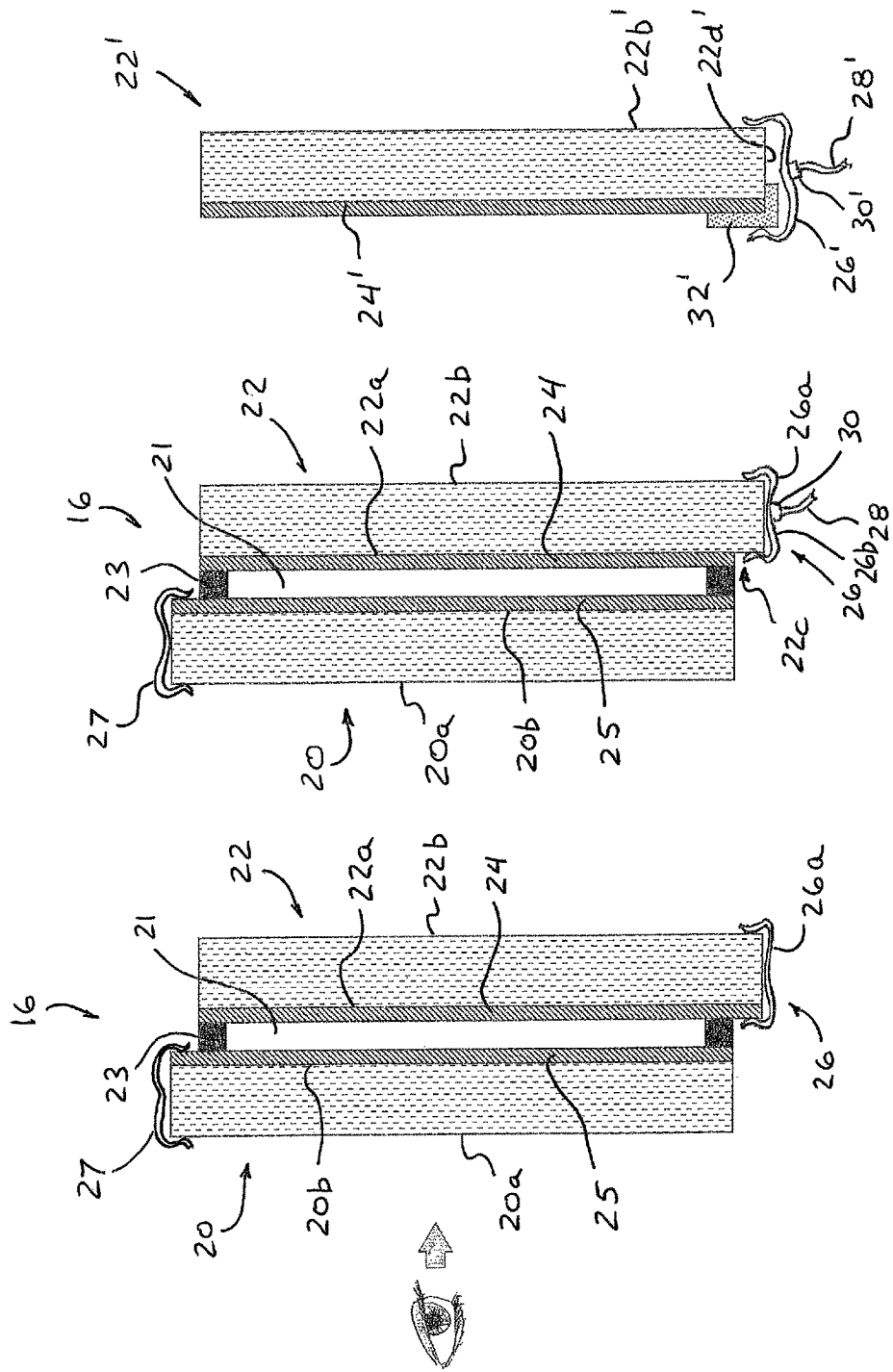

INTERIOR REARVIEW MIRROR SYSTEM FOR VEHICLE

CROSS REFERENCE TO RELATED APPLICATIONS

The present application is a continuation of U.S. patent application Ser. No. 13/020,110, filed Feb. 3, 2011, now U.S. Pat. No. 9,205,780, which claims the filing benefit of U.S. provisional application Ser. No. 60/301,417, filed Feb. 4, 2010, which is hereby incorporated herein by reference in its entirety.

FIELD OF THE INVENTION

The present invention relates to rearview mirror assemblies for vehicles and, more particularly, to electro-optic reflective element assemblies, such as electrochromic reflective element assemblies.

BACKGROUND OF THE INVENTION

Automotive auto-dimming electrochromic mirror reflective element assemblies are known and typically include a front substrate and a rear substrate and an electrochromic medium sandwiched therebetween and contained within an interpane cavity. The front substrate typically includes a transparent conductive coating established at its rearward surface (its surface immediately facing the rear substrate and the electrochromic medium) and the rear substrate typically includes a conductive coating (such as a metallic reflector coating or coatings and/or a transparent conductive coating or coatings) established at its front surface (its surface immediately facing the front substrate and the electrochromic medium). Electrical connectors are conventionally provided, typically as metallic busbar clips that extend substantially along respective edges of the substrates, to provide electrical current to the conductive coatings to control the dimming or darkening of the electrochromic medium. Electrical wires or leads are soldered to the metallic busbar clips to connect the busbar clips to the power source or circuitry of the mirror or vehicle.

SUMMARY OF THE INVENTION

The present invention provides an electro-optic mirror reflective element assembly, such as an electrochromic mirror reflective element assembly, that has electrical connectors for electrically dimming the electro-optic medium of the reflective element assembly that are provided in such a way that stresses and/or strains on the glass substrate or substrates used are mitigated or reduced, thereby mitigating and/or reducing cracking and/or spalling of such glass substrates during manufacturing of the mirror assemblies and during use of the mirror assemblies on vehicles driven on roads. In accordance with the present invention, a metallic reflector coating or layer, typically disposed at the third surface of the rear glass substrate (the surface of the rear glass substrate that immediately faces the electro-optic medium disposed between the second surface of the front substrate and the third surface of the rear substrate) is locally removed (so as to locally expose a bare glass or non-metallic reflector coated glass surface thereat) at the region where an electrical solder joint is to be established (such as where an electrical lead or wire is soldered to the likes of an electrical spring clip or connector, such as is conventionally used in the automatic electrochromic rearview mirror assembly art), thereby reducing direct contact of the solder to the metallic reflector coating on the third surface of the laminate electro-optic reflective element assembly.

By so locally removing the third surface metallic mirror reflector (and/or by locally masking during formation or deposition of the mirror reflector itself and/or otherwise electrically insulating or isolating the solder joint from the metallic mirror reflector), the locally formed or established solder joint is preferably a solder and glass surface joint and so the solder joint is decoupled from and is separate and distinct from where the metallic reflector is disposed on that third surface of the rear glass substrate of the laminate electro-optic reflective element assembly. Also, by affirmatively locally exposing the glass surface where the solder joint is to be made, the present invention reduces or mitigates the stresses and strains at the glass substrate that can otherwise lead to local surface imperfections and/or cracks and/or spalling being generated and/or opened up at the glass when the electro-optic mirror reflective element assembly is manufactured and/or mounted and/or used in or on a vehicle (and with such imperfections and/or cracks and/or spalling potentially leading to overall fracturing or breaking of the part, especially when such an electro-optic mirror reflective element assembly is part of an exterior rearview mirror assembly that is mounted at a vehicle exterior such that it is exposed to various stresses and strains including thermal stresses and strains when used in climate extremes or when subjected to the likes of hoop stresses or the like due to mounting the reflective element within a bezel or mounting the reflective element to a mirror holder that itself is attached to and is movable by an exterior mirror actuator, such as commonly known in the art). The present invention thus locally removes the metallic third surface reflector at the solder joint of the electrical clip or connector to mitigate or reduce or limit or avoid increased stresses and strains at the glass substrate that may otherwise lead to glass cracking, fracture and/or spalling and part failure. It was found that such local removal of the third surface mirror reflector at the solder joint area or region of the glass substrate in accordance with the present invention unexpectedly and surprisingly significantly mitigates such cracks/spalling at the glass substrate.

These and other objects, advantages, purposes and features of the present invention will become apparent upon review of the following specification in conjunction with the drawings.

BRIEF DESCRIPTION OF THE DRAWINGS

FIG. 4 is a sectional view of the electro-optic mirror reflective element taken along the line IV-IV in FIG. 3;

FIG. 5 is a sectional view of the electro-optic mirror reflective element taken along the line V-V in FIG. 3;

FIG. 6 is a sectional view of a glass substrate of an electro-optic mirror reflective element, with an overcoating layer that overcoats the metallic reflector at the region where the electrical lead or wire is soldered to the electrical clip in accordance with the present invention;

DESCRIPTION OF THE PREFERRED EMBODIMENTS

Figure 1:
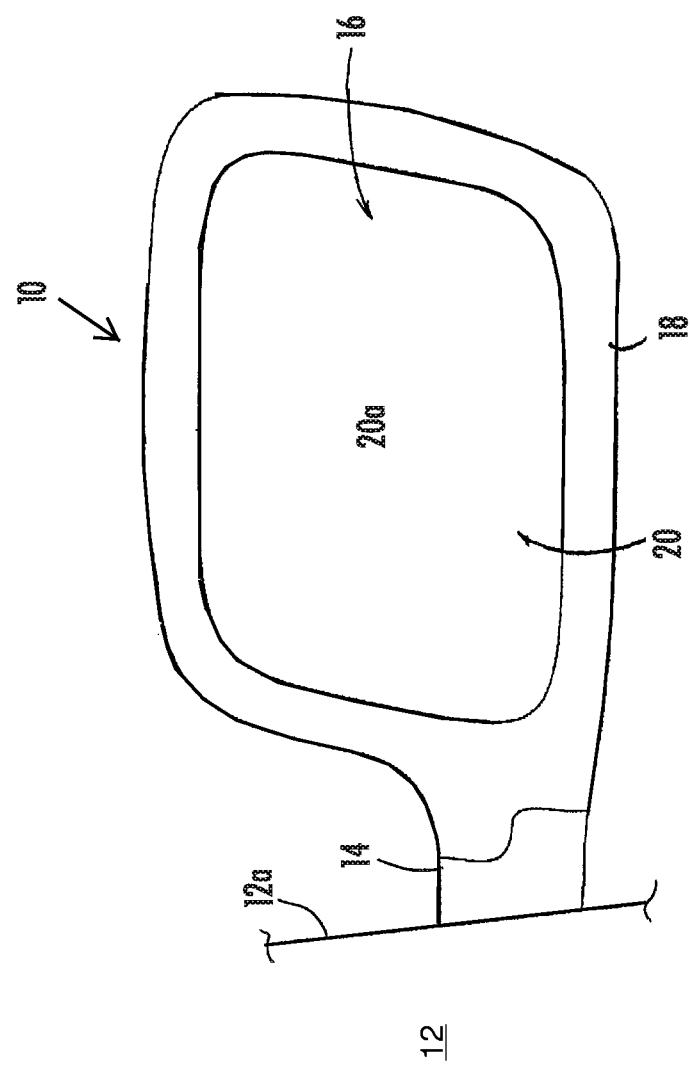
FIG. 1 is a perspective view of an exterior rearview mirror assembly incorporating a reflective element assembly in accordance with the present invention.

In some mirror reflective element assemblies, failures occur due to breaking or cracking or spalling of the rear substrates at the solder joint for attaching the wires to the busbar clips along the edge region of the rear substrate. When soldering to a clip attached to the front substrate with the transparent conductive coating (such as indium tin oxide (ITO) or the like), the solder flows on the clip only and it does not wet and bond to the ITO coated surface. The clip thus can be removed from the front substrate after the wire is soldered to the clip. However, when soldering to a clip attached to a rear substrate having a metallic mirror reflector coating (such as, for example, a coating of chromium/ruthenium (Cr/Ru) or the like), the solder flows on the clip as well as onto the metallic reflector coated surface. The solder thus bonds or couples the clip to the metallic reflector coated substrate, so that the clip is typically not removable from the glass substrate without breaking the glass at the area at which the wire is soldered to the clip. Such coupling of the solder to the metallic reflector also may lead to surface imperfections or spalling or cracking of the glass substrate at the region where the solder joint is made. This is because the coupling of the clip/solder/metallic reflector (such as Cr—Ru or the like) puts significant stress at the point of solder or solder joint and, after thermal cycling and/or mechanical vibration, may create a V-notch crack in the glass (or may cause other surface imperfections or spalling or the like at the glass substrate at or near the solder joint). Such surface and/or edge flaws may result in a crack that propagates in the rear substrate with thermal and mechanical stresses, leading to part failure of the mirror reflective element assembly when used on a vehicle.

Also, the flow of solder onto the metallic coating may be much more efficient in transferring heat onto the glass substrate. This may be significant since a one degree F. change in temperature between two regions on a glass substrate can induce as much as 50 psi of stress. Soldering is typically done at about 600 or 700 degrees F. for about two to three seconds. During the soldering process, even if 200 degrees F. is transferred by the flow of solder onto the metallic coating, the stresses imparted by such a temperature change at that area may exceed the typical strength of annealed sodalime glass, which typically breaks at around 8000 psi.

Thus, in order to reduce such cracks or flaws or failures at the rear glass substrate of the likes of a laminate type electrochromic exterior rearview mirror assembly, the present invention provides an assembly process that decouples the clip-solder from the metallic reflector coating (such as a Cr—Ru coating or the like). For example, the present invention may establish a localized area of the glass substrate at or near or adjacent to the solder point or solder joint that is devoid of the metallic reflector coating, such as by masking the area of the glass substrate at or near the point of solder during the coating or deposition process, or by laser deletion of the metallic reflector coating from the glass substrate at or near or adjacent to the point of solder, or by masking the metallic reflector coating at the solder joint area after deposition of the coating, such as with a high temperature tape or the like, at or near or adjacent to the point of solder, or by providing a clip that limits or substantially precludes the flow of solder from the solder point to the metallic reflector coated glass substrate, or by soldering the wire to the metallic busbar clip before the clip is attached to the glass substrate, or by contaminating the solder joint at the metallic reflector coating such that when the clip is attached, the solder does not wet the metallic reflector coated surface. Although described as having a chromium-ruthenium coating, the present invention is suitable on glass substrates having other types of metallic coatings, such as, for example, coatings that comprise one or more of chromium, ruthenium, rhodium, silver, nickel, aluminum, molybdenum, palladium, platinum, stainless steel and/or the like or alloys of such metallic coatings or any other conductive coating (metallic or oxide) that has an affinity for solder flow, while remaining within the spirit and scope of the present invention.

Referring now to the drawings and the illustrative embodiments depicted therein, an exterior rearview mirror assembly 10 is mounted at an exterior portion 12*a* of a vehicle 12 (such as at a side door of the vehicle) via a mounting arm or portion 14 (FIG. 1). Mirror assembly 10 includes an electro-optic reflective element 16 (such as an electrochromic reflective element assembly) and a housing or casing 18. The reflective element assembly 16 is electrically connected to a circuit element or circuitry (such as a printed circuit board or the like within the mirror casing or at the vehicle) that is electrically powered to control the dimming or darkening of the reflective element assembly 16, as discussed below. Although shown as incorporated in an exterior rearview mirror assembly, aspects of the present invention may be suitable for use in interior rearview mirror assembly applications, while remaining within the spirit and scope of the present invention.

The reflective element 16 includes a front glass substrate 20 and a rear glass substrate 22 (FIGS. 2-5), with an electro-optic medium 21 (such as an electrochromic medium) disposed therebetween (and sealed or contained within the interpane cavity between the glass substrates via a perimeter seal 23, such as in a known manner). The front substrate 20 has a front or first surface 20*a* (that is viewable by a driver of a vehicle when the mirror assembly is normally mounted at the vehicle) and a rear or second surface 20*b* (opposite the first surface of the front substrate), with a transparent conductive coating 25 (such as an indium tin oxide (ITO) coating or the like) established on the second or rear surface 20b of the front substrate 20 and with the second surface 20b facing the electro-optic medium 21. The rear substrate 22 has a front or third surface 22a (facing the electro-optic medium 21 disposed between the front and rear substrates) and a rear or fourth surface 22b (opposite the third surface of the rear substrate), with a metallic reflector coating 24 (such as a transflective display-on-demand reflector coating that is partially transmissive of light therethrough and partially reflective of light incident thereon) established at the third surface 22a of rear substrate 22. The metallic reflector coating 24 may comprise any suitable metallic conductive coatings or layers and may comprise a single layer or multiple layers of coatings (such as a stack of metallic layers and transparent conductive layers and/or the like), without affecting the scope of the present invention. An electrical connector 27 is electrically conductively connected to the transparent conductive coating 25 at the second surface of front substrate 20 (such as along an upper region of the front substrate in FIGS. 4 and 5, but it could be at or along another region or regions of the front substrate without affecting the scope of the present invention), and another electrical connector 26 is electrically conductively connected to the metallic reflector coating 24 at third surface 22a of rear substrate 22 (such as along a lower region of the rear substrate in FIGS. 4 and 5, but it could be at or along another region or regions of the rear substrate without affecting the scope of the present invention), whereby electrical power is supplied to the coatings 25, 24 via electrically conductive wires or leads 28 that are attached or connected to the connectors 27, 26 to vary the degree of dimming or darkening of the electro-optic medium, such as in a known manner.

Electrical connector 26 comprises an elongated clip or busbar connector that receives the perimeter edge region 22b of the glass substrate 22 at or in a plurality of clip portions or spring clips 26a and spans or bridges the perimeter edge of the rear glass substrate to establish electrically conductive connection to the metallic reflector coating at the third surface of the rear glass substrate. The clip portions 26a (such as a flexible spring clip that clamps around the edge of the substrate such as is known in the art) receive and clip and/or clamp onto the edge region 22b of the glass substrate 22 and contact the metallic reflector coating 24 so as to establish electrical conductivity to the reflector coating 24, and the clip portions may include prongs or teeth to bite into the coating 24 at the third surface 22a of glass substrate 22 to enhance electrical conductive continuity between the coating and the connector and to enhance retention of the connector at the glass substrate. Such connectors or clips thus provide a spring-like ribbon edge connector that is typically formed by extrusion of the likes of a copper/beryllium alloy or the like.

Figure 2:
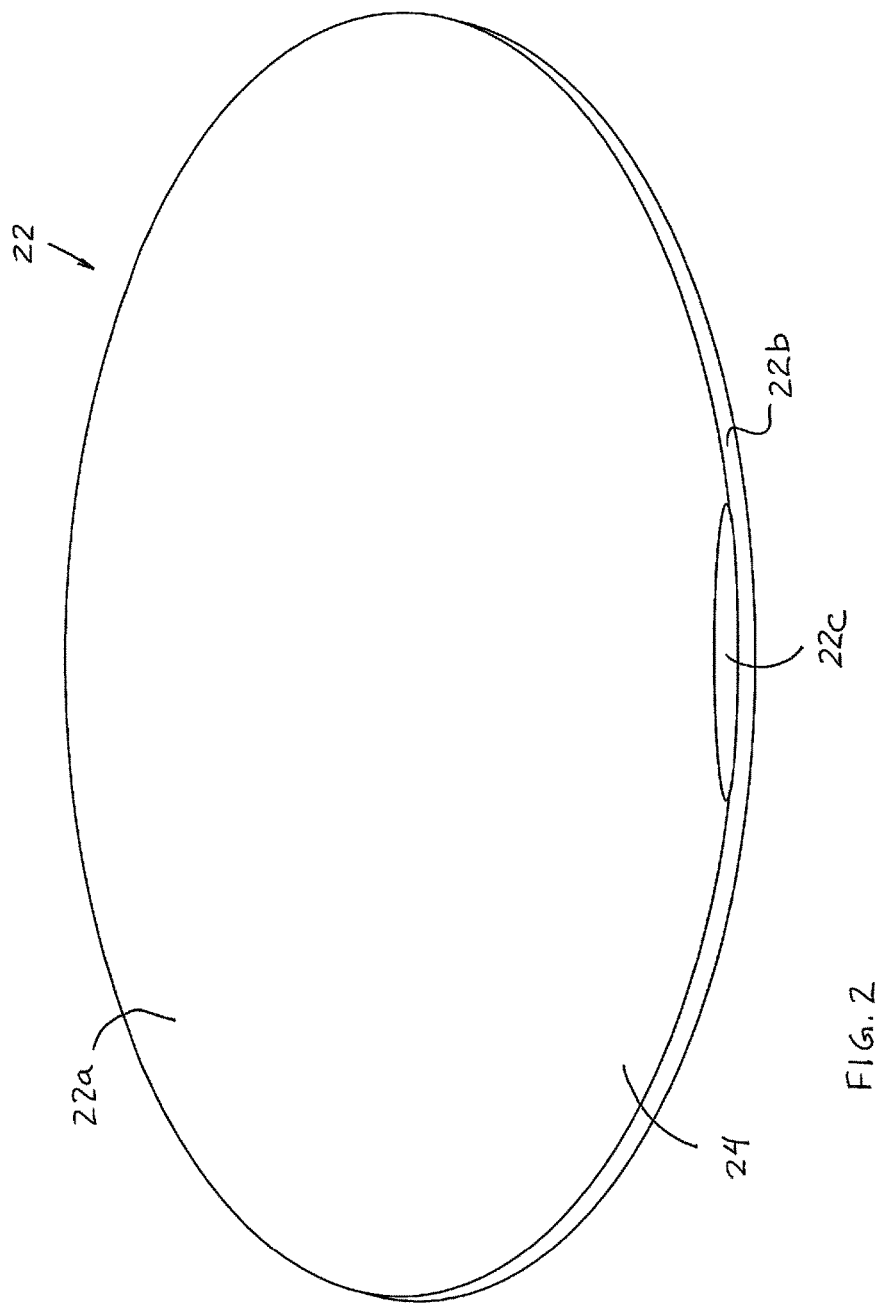
FIG. 2 is a perspective view of a glass substrate having a metallic reflector coated surface with the metallic reflector coating removed from a portion of a perimeter edge region of the substrate in accordance with the present invention.
Figure 3:
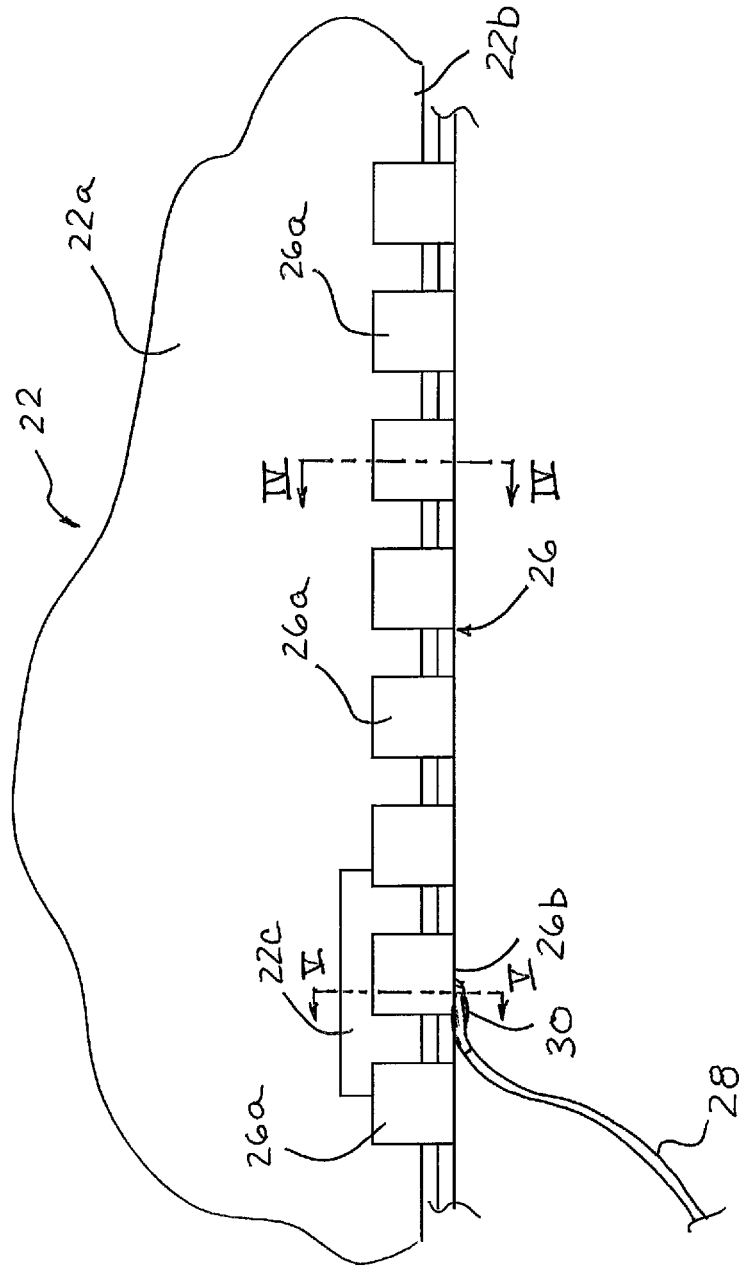
FIG. 3 is a plan view of a portion of the glass substrate of an electro-optic mirror reflective element with the metallic reflector coating removed from the portion of the perimeter edge region of the substrate at or near where an electrical lead or wire is soldered to the electrical clip along the edge of the substrate.

As shown in FIGS. 2, 3 and 5, the metallic reflector coating 24 may be locally removed or not present at a perimeter edge region 22c of glass substrate 22. The locally removed area or region 22c coincides with or is adjacent to or at the portion 26b of the electrical connector 26 at which the electrically conductive wire 28 is attached, such as via solder 30 or the like. As can be seen with reference to FIGS. 3-5, the connector or clip 26 contacts the third surface metallic reflector coating 24 along the connecting region or perimeter edge region (via the clip portions 26a receiving and clamping on the edge region of the substrate) and remote from where the wire 28 is attached or soldered to the connector 26. Preferably, the area or region 22c that is devoid of the metallic coating encompasses a portion of the third surface of the glass substrate and the perimeter edge dimension of the glass substrate, and if any metallic coating is established at the fourth or rear surface of the rear substrate, the devoid area preferably also encompasses the area of the rear surface that is at or near or adjacent to the solder point or joint. Thus, any solder that flows onto the clip and toward and to the glass surface may be disposed at the region 22c where the metallic reflector coating or coatings is/are locally removed and thus may not contact and bond or attach to the metallic reflector coating. Although the third surface metallic reflector is shown in FIG. 5 as terminating at the perimeter seal, the third surface metallic reflector may extend outboard of the seal or may terminate within the seal or the like, so long as it does not encompass the region at which the solder joint is made.

The present invention thus avoids a basic concern with such clamps or clips on glass substrates with wires soldered thereat, with such basic concern being that the metallic busbar clip that is attached to the glass edge typically has teeth to bite into the coatings and glass substrate and has openings through the clip to allow for bending or flexing of the clip in situations where the clip may have to bend around sharp corners of a glass substrate. The openings in the clip may allow for the solder, when in its molten or liquid state during soldering of the wire to the clip, to flow through the clip and contact or wet the metallic coating at the surface of the glass substrate. The soldering process thus may substantially heat the glass via heating of the metallic reflector coating and may couple the clip, glass (with the metallic coating established at a surface thereof) and cured solder, which may lead to damage of the glass substrate.

Typically, there are imperfections in the glass edge caused by the cutting, seaming and handling of the glass substrate. As can be seen in FIGS. 4-6, the spring-like ribbon edge connector or clip 26 (such as conventionally used as edge conductive busbars on the likes of exterior electrochromic rearview mirror reflective elements and especially where the mirror reflective element is included in a plastic bezel, such as mirror assembly as described in U.S. Pat. No. 5,151,824, which is hereby incorporated herein by reference in its entirety) receives an edge region of the glass substrate therein and applies a spring-like pressure on both the front and rear surfaces of the glass substrate. Such pressure, such as via teeth or prongs on the spring-like ribbon edge connector clip, may bite into the glass surface or surfaces to retain the clip at the glass substrate. Furthermore, the act of soldering, where the likes of a soldering iron or the like is used to locally heat the metallic clip where the solder joint is being formed, inevitably, both by heat conduction/convention and by solder flow onto the glass surface and edge of the glass substrate at the solder joint being formed, further exacerbates and potentially further opens up localized hairline cracks/imperfections and/or the like at the glass edge and/or surface of the glass substrate. Although usually not visible at the time of initial manufacture of the reflective element assembly (such as immediately after soldering the wire to the clip or busbar), quantities of exterior electrochromic mirror elements utilized on vehicles may develop local or full cracks at least partially across the substrate surface or solder joint area and thus lead to warranty returns and product rejections. Surprisingly and unexpectedly, we find that affirmative removal of the reflector coating locally to the area of the third surface at where the solder joint is to be established greatly mitigates/reduces such cracks/imperfections at the glass substrate.

The flow of solder is a very efficient process of transferring heat (under normal manufacturing processes, the manual soldering takes about 2 to 3 seconds per side). If the solder stays on the clip and does not wet the coated glass substrate, some heat is transferred to the glass, but if the solder flows onto and wets the metallic coating or layer, this will increase the heat transfer to the glass substrate. Because every one degree F. in heat change between two points on a glass substrate may result in 50 psi of stress to the glass substrate, and because normal soldering is done at around 600 to 700 degrees F., and because normal annealed glass has a strength of 8000 psi (this strength depends on the edge quality), even if a portion of the solder heat (such as, for example, around 300 degrees F.) is transferred during the soldering process (such as via the molten solder flowing onto the metallic coating on the glass substrate), the stresses to the glass can readily exceed the 8000 psi strength of the glass substrate and thus lead to cracks and failures in the glass substrates.

The coupling of the clip, solder and glass also can impart additional stresses at the point or location of the solder or solder joint. These additional stresses can cause edge chips during thermal cycling or additional mechanical vibration and/or other induced stresses during assembly of the mirror to the backplate and attaching the subassembly to the mirror housing via the actuator. Other stresses, such as stresses imparted by the mirror actuator, the mirror heater pad turning on and off, road vibration, snow/ice and/or the like, may also cause damage to a compromised edge and/or surface of a glass substrate. The glass breakage that occurs due to such stresses is often referred to as a low stress failure, which typically is characterized by a single line crack that starts from one edge and extends toward another edge. In contrast, a high stress crack would typically show many lines of crack from a starting point. The low stress crack typically occurs when there is a significant edge and or surface chip/crack on the glass substrate. Thus, it has been unexpectedly and surprisingly found that such low stress cracks may be mitigated or reduced or limited by decoupling the clip/solder/glass joint, which may reduce chips and/or cracks at the perimeter edge region at or near or adjacent to the solder joint, thereby reducing part failures on vehicles.

Optional decoupling means or processes or configurations may include, for example, providing a means of eliminating the coating at or near or adjacent to the edge at the point of soldering. Typically, the soldering or solder joint extends or covers a length of about 8 mm to about 10 mm or thereabouts along the edge of the glass substrate. The uncoated surface and edge (devoid of the metallic coating) may comprise an area slightly larger than the soldering area to compensate for normal manufacturing variations (such as, for example, an area that is about 15 mm along the edge of the glass substrate). The uncoated area may thus be about 15 mm long (or longer or shorter) and about 4 mm wide (or wider or narrower). This uncoated area should be smaller than the bezel width so as to be substantially non-viewable by a person viewing the assembled mirror assembly when the mirror assembly is normally mounted at a vehicle.

Optionally, the decoupling process may involve masking the glass such that no coating is deposited on the glass surface and on the glass edge (and no coating should be on the rear surface of the glass substrate as well, so that both surfaces and the glass edge dimension are devoid of the metallic coating at or near or adjacent to the solder point) to establish an exposed glass surface/edge at the solder joint area, or the process may involve any suitable means of localized removal of the coating after the coating operation (such as via laser ablation, chemical etching or removal, mechanical removal and/or the like), or the process could involve depositing a mask prior to coating and washing the mask off after the deposition. Optionally, and such as shown in FIG. 6, the decoupling may be achieved by depositing a coating or overcoating 32' that does not have affinity for solder flow at or near or adjacent to the area or point of solder 30' (where the solder attaches the lead or wire 28' to the clip 26') and on top of the metallic coating 24' that has affinity for solder flow. As shown in FIG. 6, the overcoating 32' overlaps the third surface metallic reflector coating 24' at the solder region and may overlap the perimeter edge dimension 22d' of the rear substrate 22' and optionally may overlap the fourth surface 22b', such as if the fourth surface 22b' is coated with a coating that has an affinity for solder flow, while remaining within the spirit and scope of the present invention). Optionally, another approach may apply a mask or a solder resist post coating at the area adjacent to the solder point to limit or substantially preclude or stop the solder from flowing onto and wetting the metallic layer. For example, such an approach may involve putting/wiping a "contaminant" or separating layer or shielding layer onto the metallic layer at the point of soldering to stop the solder from flowing onto the metallic layer. Suitable compounds for such a "contaminant" may include, for example, Boron nitride, oils, greases, and/or the like, or optionally a tape material, such as Kapton tape or the like may be applied as a contaminant or shield or separating layer to separate the solder from the metallic coating. Optionally, the clip may be designed or configured to limit or substantially preclude the flow of solder through or around the clip at the solder point (such as by forming the clip such that there are no openings in the clip at the point of soldering) or adding a tape or an insert to block the openings in the clip. Optionally, the decoupling process or approach may involve soldering the wires to the clips off the glass substrate, such as before the clips are attached to the glass substrate.

Figure 12:
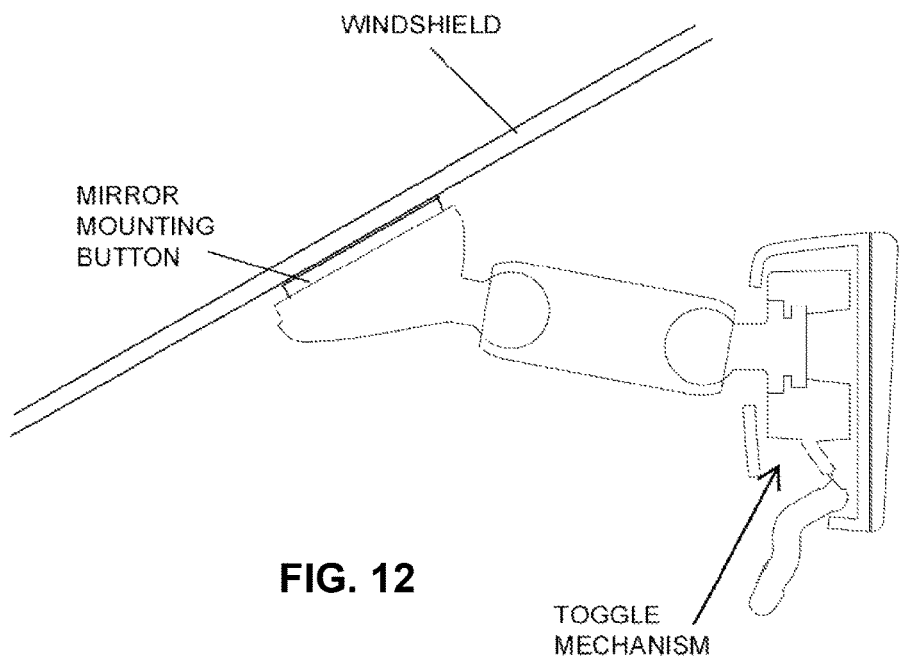
FIG. 12 is a sectional view of an interior rearview mirror assembly with a toggle mechanism.

Optionally, the mirror reflective element may comprise an interior rearview mirror assembly that is adjustably mounted to or attached to or at an interior portion or surface of the vehicle, such as to an in-cabin surface of the vehicle windshield, such as via a mirror mounting button or the like adhered to the in-cabin surface of the vehicle windshield (such as shown in FIG. 12). The mirror reflective element may comprises a mirror reflective element as described above, or may comprise any suitable prismatic or electro-optic mirror reflective element. The mirror assembly may be adjustably mounted at the interior portion of the vehicle via any suitable mounting assembly or mounting configuration, such as a mounting assembly that utilizes aspects of the mounting assemblies or configurations described in U.S. Pat. Nos. 6,318,870; 6,593,565; 6,690,268; 6,540,193; 4,936,533; 5,820,097; 5,100,095; 7,249,860; 6,877,709; 6,329,925; 7,289,037; 7,249,860 and/or 6,483,438, and/or U.S. patent application Ser. No. 11/226,628, filed Sep. 14, 2005 and published on Mar. 23, 2006 as U.S. Patent Publication No. 2006/0061008, and/or PCT Application No. PCT/US2010/028130, filed Mar. 22, 2010 and published Sep. 30, 2010 as International Publication No. WO 2010/111173, and/or U.S. provisional applications, Ser. No. 61/351,377, filed Jun. 4, 2010; and/or Ser. No. 61/426,328, filed Dec. 22, 2010, which are hereby incorporated herein by reference in their entireties.

Figure 7:
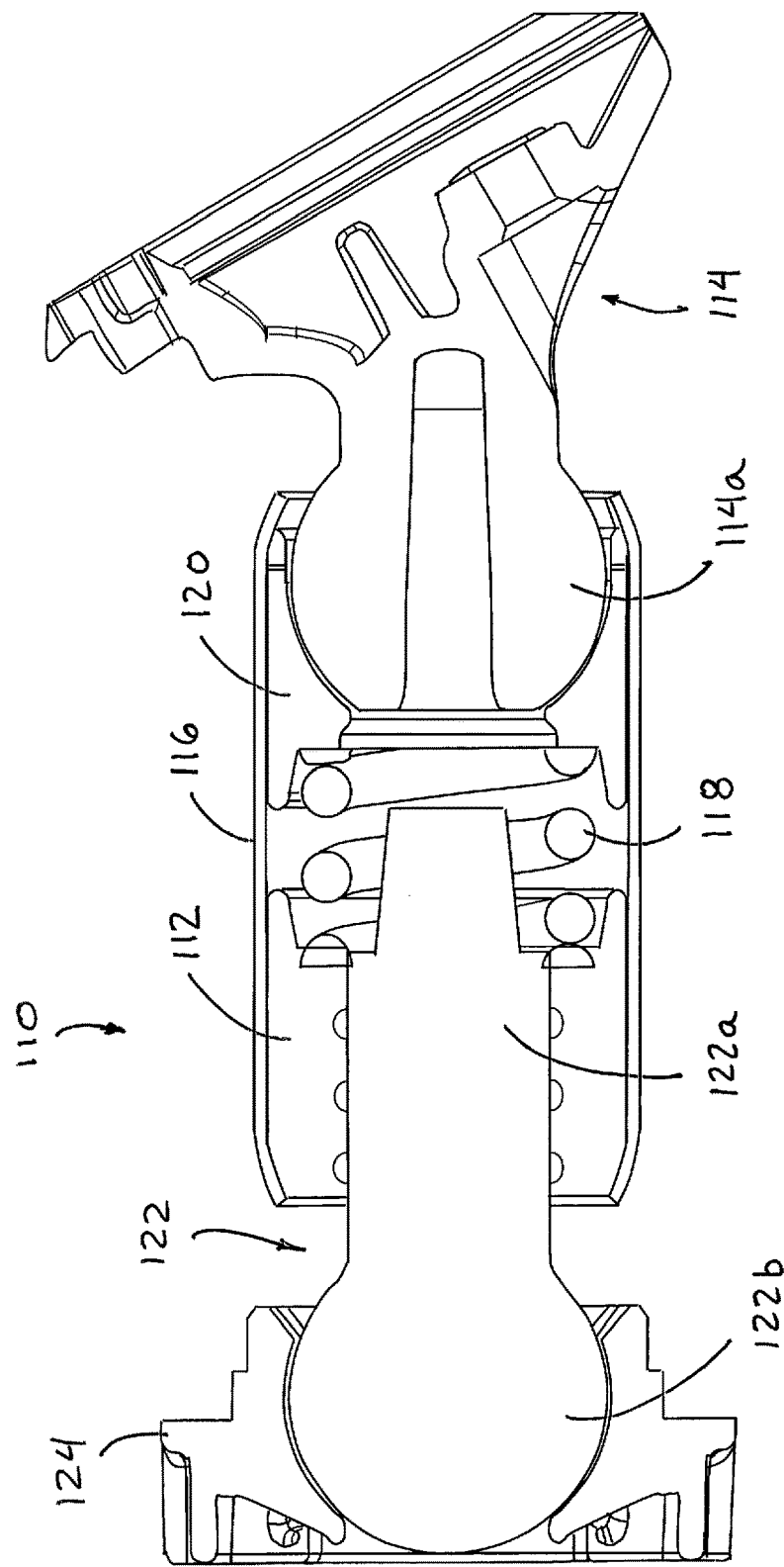
FIG. 7 is a sectional view of a mirror mounting assembly suitable for use with an interior rearview mirror assembly in accordance with the present invention.
Figure 8:
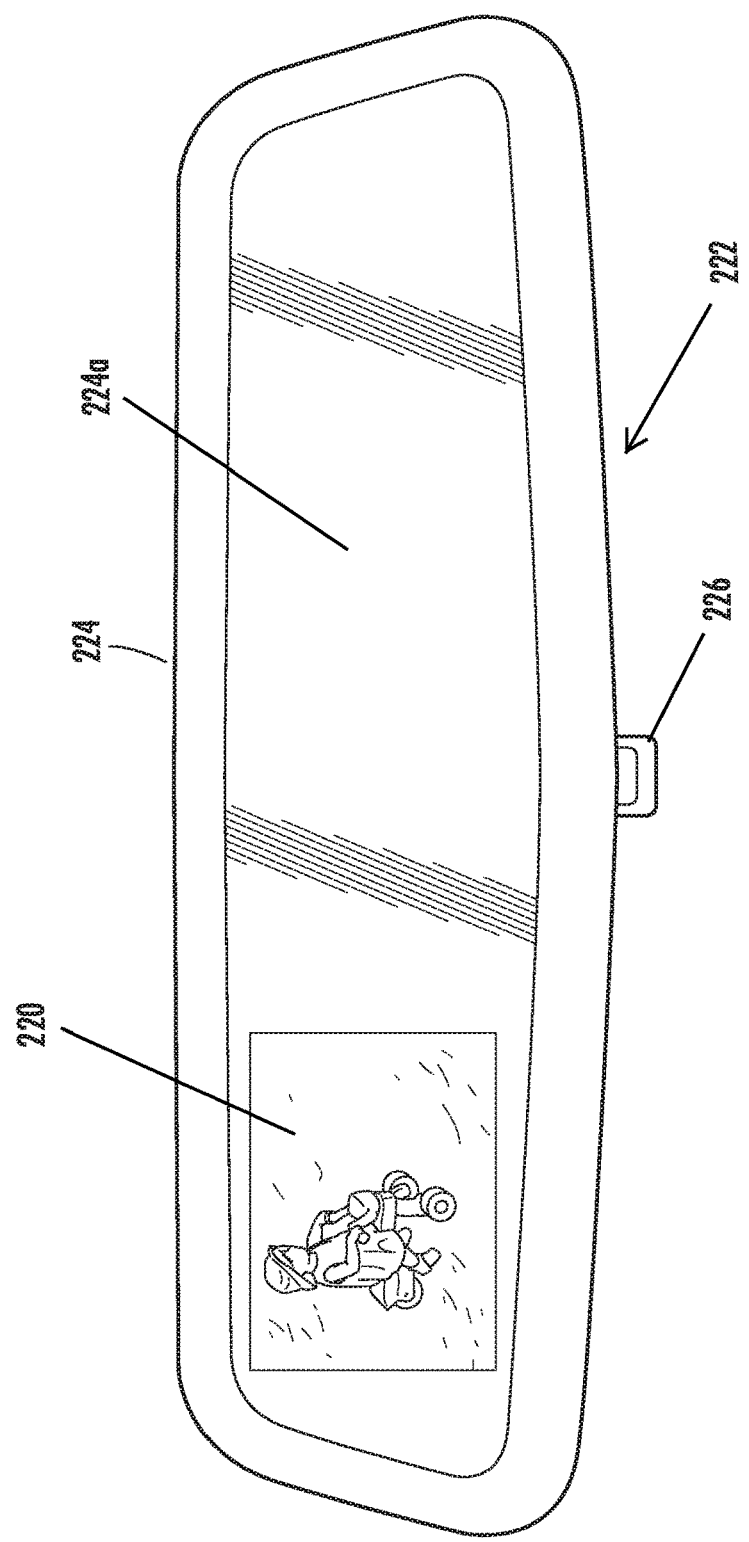
FIG. 8 is a perspective view of a prismatic interior rearview mirror assembly including a video display screen in accordance with the present invention.

Optionally, the mounting assembly may comprise an impact absorbing mounting assembly to at least partially absorb an impact to the interior rearview mirror assembly, such as during a vehicle collision or the like. For example, and with reference to FIG. 7, a mounting assembly 110 may include a dampening element or bushing 112 that functions to absorb impact. In the illustrated embodiment, the double ball mounting assembly 110 includes a base portion or mirror mount 114 (with a ball member 114a established thereat), which attaches at the in-cabin surface of the vehicle windshield via attachment to a mirror mounting button or the like, such as in a known manner. Mirror mounting assembly 110 includes a mounting arm 116 that receives ball member 114a at one end and receives bushing 112 at the opposite end, with a spring or biasing element 118 disposed between the bushing 112 and a receiving element 120 at ball member 114a. A ball stud 122 includes a stud or stem 122a that is received in and through bushing 112 and is substantially secured or retained therein, such as via a tight or "super-tight" fit between the rigid ball stud (such as a ball stud comprising a die cast metal or a rigid plastic or polymeric material) and the bushing 112 (such as a bushing comprising a soft or hard polyurethane or molded plastic or other resilient/somewhat elastomeric polymeric material). The ball stud 122 includes a ball member 122b that is pivotally received in a mirror head socket 124 to pivotally attach the mirror head to the ball stud 122 and to the mounting assembly 110.

Thus, the double ball mounting system utilizes a bushing and a die-cast or very rigid plastic ball stud piece. The bushing and ball stud may be pre-assembled and have a super-tight fit, and then are assembled to the mounting arm 116 and mirror head socket 124 in a manner similar to known constructions. During normal use and adjustment of the mirror head relative to the interior portion of the vehicle, the mounting assembly has no effect on the performance and adjustment of the mirror assembly. During an impact with the mirror assembly, the ball stud may push into the arm or tube assembly and the bushing may damp the motion to absorb much of the energy. The mirror head socket 124 or the mirror ball 122b would then bottom out at or contact the bushing to limit or stop the travel of the ball stud and mirror head toward the mounting arm and mounting base and interior portion of the vehicle. Optionally, and desirably, the interface between the bushing and the mounting arm and between the bushing and the ball stud would be sufficiently strong to limit or substantially preclude pull out of the ball stud from the bushing and pull out of the bushing from the mounting arm (such as with a target pull out force that is greater than the current tensile crimp strength). Optionally, a bushing such as described above may be implemented in a single ball or single pivot mounting assembly or system, while remaining within the spirit and scope of the present invention.

The interior mirror assembly or assemblies discussed herein may comprise an electro-optic or electrochromic mirror assembly and may include an electro-optic or electrochromic reflective element. The electrochromic mirror element of the electrochromic mirror assembly may utilize the principles disclosed in commonly assigned U.S. Pat. Nos. 7,813,023; 7,310,178; 7,274,501; 7,255,451; 7,195,381; 7,184,190; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, and/or PCT Application No. PCT/US2010/029173, filed Mar. 30, 2010 and published on Oct. 7, 2010 as International Publication No. WO 2010/114825, which are hereby incorporated herein by reference in their entireties, and/or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS, Optical Engineering Press, Wash. (1990), which are all hereby incorporated by reference herein in their entireties. Optionally, the electrochromic circuitry and/or a glare sensor (such as a rearward facing glare sensor that receives light from rearward of the mirror assembly and vehicle through a port or opening along the casing and/or bezel portion and/or reflective element of the mirror assembly) and circuitry and/or an ambient light sensor and circuitry may be provided on one or more circuit boards of the mirror assembly.

Optionally, the reflective element may include a metallic perimeter band around the perimeter of the reflective element, such as by utilizing aspects of the reflective elements described in U.S. Pat. Nos. 7,626,749; 7,274,501; 7,184,190 and/or 7,255,451, and/or U.S. patent application Ser. No. 11/226,628, filed Sep. 14, 2005 and published on Mar. 23, 2006 as U.S. Patent Publication No. 2006/0061008, which are all hereby incorporated herein by reference in their entireties. Optionally, the perimeter band may comprise a chrome or chromium coating or metallic coating and may comprise a chrome/chromium or metallic coating that has a reduced reflectance, such as by using an oxidized chrome coating or chromium oxide coating or "black chrome" coating or the like (such as by utilizing aspects of the mirror assemblies described in U.S. Pat. Nos. 7,184,190 and/or 7,255,451, which are hereby incorporated herein by reference in their entireties). Optionally, the mirror reflective element may comprise a frameless reflective element (such as a frameless exterior mirror assembly or a frameless interior mirror assembly), such as by utilizing aspects of the reflective elements described in U.S. Pat. Nos. 7,626,749; 7,360,932; 7,255,451; 7,274,501 and/or 7,184,190, and/or PCT Application No. PCT/US2004/015424, filed May 18, 2004 and published on Dec. 2, 2004, as International Publication No. WO 2004/10377282; and/or U.S. patent application Ser. No. 11/226,628, filed Sep. 14, 2005 and published on Mar. 23, 2006 as U.S. Patent Publication No. 2006/0061008; and/or Ser. No. 10/538,724, filed Jun. 13, 2005 and published on Mar. 9, 2006 as U.S. Patent Publication No. 2006/0050018; and/or PCT Application No. PCT/US10/32017, filed Apr. 22, 2010 and published on Oct. 28, 2010 as International Publication No. WO 2010/124064; and/or PCT Application No. PCT/US10/51741, filed Oct. 7, 2010 and published on Apr. 14, 2011 as International Publication No. WO 2011/044312, which are all hereby incorporated herein by reference in their entireties.

Optionally, the mirror reflective element of an interior rearview mirror assembly may comprise a prismatic mirror reflective element or a non-electro-optic mirror reflective element and may be flipped or toggled between a day reflectivity position and a night or reduced reflectivity position (where the mirror reflector is angled upward towards the ceiling of the vehicle cabin and the driver views a reflection off of the front surface of the glass mirror substrate, such as in a known manner. For example, the interior rearview mirror assembly may comprise a prismatic mirror assembly, such as the types described in U.S. Pat. Nos. 7,249,860; 6,318,870; 6,598,980; 5,327,288; 4,948,242; 4,826,289; 4,436,371 and 4,435,042; and PCT Application No. PCT/US2004/015424, filed May 18, 2004 and published on Dec. 2, 2004, as International Publication No. WO 2004/103772, which are hereby incorporated herein by reference in their entireties. Optionally, the prismatic reflective element may comprise a conventional prismatic reflective element or prism or may comprise a prismatic reflective element of the types described in U.S. Pat. Nos. 7,420,756; 7,274,501; 7,249,860; 7,338,177 and/or 7,255,451, and/or PCT Application No. PCT/US03/29776, filed Sep. 19, 2003 and published Apr. 1, 2004 as International Publication No. WO 2004/026633; and/or PCT Application No. PCT/US2004/015424, filed May 18, 2004 and published on Dec. 2, 2004, as International Publication No. WO 2004/103772, and/or PCT Application No. PCT/US10/32017, filed Apr. 22, 2010 and published on Oct. 28, 2010 as International Publication No. WO 2010/124064; and/or PCT Application No. PCT/US10/51741, filed Oct. 7, 2010 and published on Apr. 14, 2011 as International Publication No. WO 2011/044312, and U.S. provisional application Ser. No. 60/525,952, filed Nov. 26, 2003, which are all hereby incorporated herein by reference in their entireties, without affecting the scope of the present invention. A variety of mirror accessories and constructions are known in the art, such as those disclosed in U.S. Pat. Nos. 5,555,136; 5,582,383; 5,680,263; 5,984,482; 6,227,675; 6,229,319 and 6,315,421 (the entire disclosures of which are hereby incorporated by reference herein), that can benefit from the present invention.

Figure 13:
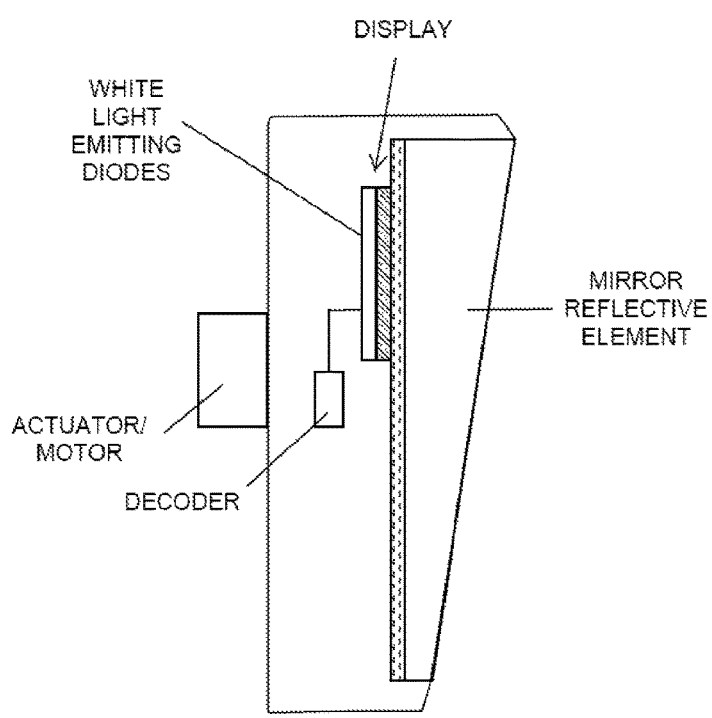
FIG. 13 is a schematic of an interior rearview mirror assembly with an actuator/motor for pivoting the mirror head relative to an interior portion of the vehicle.

Optionally, the prismatic mirror assembly may be operable to automatically tilt or flip between its daytime position and its nighttime position, such as responsive to a light sensor or the like (such as a photo sensor that detects ambient light and/or glare at or near the mirror assembly or vehicle and determines that it is appropriate to adjust the reflectivity position of the mirror reflective element accordingly). For example, when the vehicle is driven at night, the mirror system may detect glare (such as from a following vehicle with its headlights on) and may detect or determine that the mirror head and/or reflective element is/are in the daytime or higher reflectivity state or position and may automatically flip or rotate or adjust the reflective element to its reduced reflectivity state or anti-glare position (such as via one or more actuators or motors (FIG. 13) that function to pivot the reflective element and/or mirror head relative to the interior portion of the vehicle at which the mirror assembly is mounted, such as about a generally horizontal pivot axis that extends generally laterally across the vehicle).

Optionally, in applications with a video display screen at or in the interior rearview mirror assembly (such as a video display screen disposed behind the prismatic mirror reflective element and displaying video images or information for viewing by the driver of the vehicle through the prismatic mirror reflective element and through the mirror reflector, such as a video mirror of the types described in U.S. Pat. Nos. 7,855,755; 7,626,749; 7,581,859; 7,420,756; 7,338,177; 7,249,860; 7,274,501; 7,255,451; 7,184,190 and/or 6,690,268, which are all hereby incorporated herein by reference in their entireties), washout or reduced viewability of the displayed images or information may occur during higher ambient lighting daytime driving conditions, where the reflection of the light incident on the mirror reflector overpowers the light emanating from the display screen so that washout of the displayed information occurs. For example, and as shown in FIGS. 8-10 and 13, a video display screen 220 (preferably backlit via a plurality of white light-emitting light emitting diodes) can be utilized with a prismatic interior rearview mirror element 224 in an interior rearview mirror assembly 222, such as by utilizing aspects of the mirror assemblies described in U.S. patent application Ser. No. 12/578,732, filed Oct. 14, 2009 and published on Apr. 22, 2010 as U.S. Patent No. 2010/0097469, and/or PCT Application No. PCT/US10/32017, filed Apr. 22, 2010 and published on Oct. 28, 2010 as International Publication No. WO 2010/124064; and/or PCT Application No. PCT/US10/51741, filed Oct. 7, 2010 and published on Apr. 14, 2011 as International Publication No. WO 2011/044312, which are all hereby incorporated herein by reference in their entireties. Such a prismatic interior rearview mirror assembly typically is provided with a toggle 226, which is a manually operated day-night flip mechanism, so that, when driving at night, the driver may flip the mirror to a night or anti-glare position (FIG. 10), where reflection off the angled mirrored second surface 224*b* (such as a surface having a mirror reflector 225 disposed or coated or established thereat, such as a silver or silicon or ITO/Ag/ITO mirror reflector, and preferably a transflective mirror reflector, and with reflectivity to visible light greater than about 60% R, and more preferably greater than about 75% R, and more preferably greater than about 85% R) is directed typically towards the roof of the vehicle such that the reflectivity to the driver's eyes is principally off the bare front glass surface 224*a* (such as a glass surface of a glass substrate having a refractive index around 1.52 and providing typically about 4 percent reflectivity of light incident thereon). Optionally, a photosensor-controlled automatic mirror flip or adjust mechanism may be included in the rearview mirror assembly so that, for example, when daytime ambient lighting is detected by the photosensor, the mechatronic mechanism automatically flips or adjusts the mirror to the reduced reflectivity or anti-glare position during daytime driving, if, after the previous nighttime driving of the vehicle, the orientation of the prism element had been left in the day or higher reflectivity position (FIG. 9), where the principal reflectivity of light towards the driver's eyes is off of the mirrored second surface 224*b*. Optionally, for example, the mirror system of the present invention may, such as during daytime lighting conditions, operate to automatically flip or adjust the mirror head and/or reflective element to the nighttime or reduced reflectivity state or position (FIG. 10) to reduce the washout that may otherwise occur at the video display screen 220.

Figure 9:
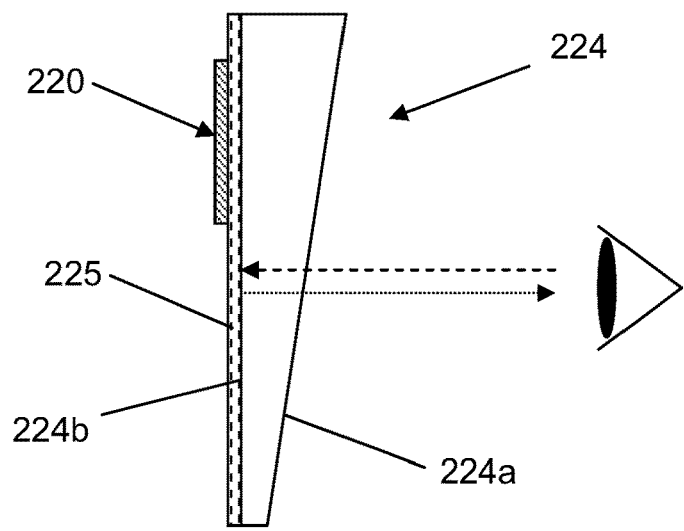
FIG. 9 is a sectional view of the prismatic mirror reflective element of a prismatic interior rearview mirror system of the present invention, shown with the prismatic mirror reflective element in a high reflectivity state or position.
Figure 10:
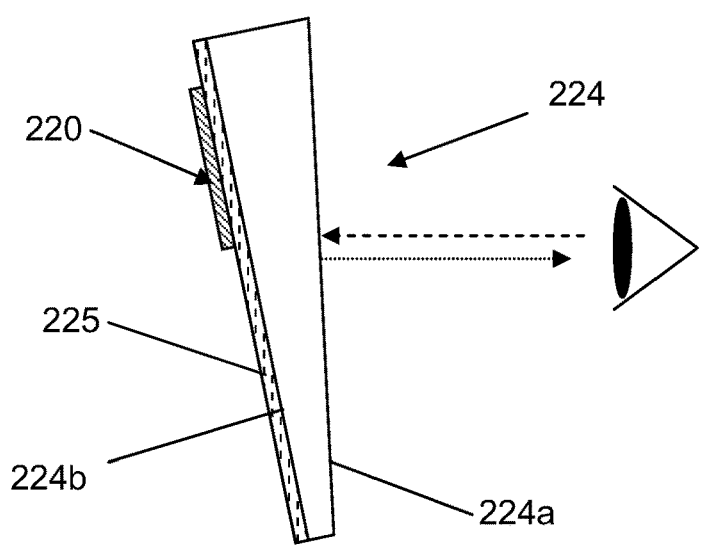
FIG. 10 is another sectional view of the prismatic mirror reflective element of FIG. 9, shown in a reduced reflectivity or anti-glare state or position.

Thus, in high ambient daytime lighting conditions and optionally responsive to when the video display screen is operating to display information or video images for viewing by the driver of the vehicle (such as during a reversing maneuver of the vehicle where the video display screen functions to display video images captured by a rearward facing camera of the vehicle to assist the driver in making the reversing maneuver), the mirror system may adjust the mirror angle to reduce the reflectivity of light at the display screen to reduce or mitigate image washout. Optionally, such an automatic mirror position adjustment may occur only in situations where (a) the display screen is displaying information for viewing by the driver of the vehicle, (b) the light detected is high enough to cause a threshold degree of washout of the displayed images/information, and (c) the mirror reflective element is in its daytime or greater reflectivity position (such as shown in FIG. 9). The mirror system may detect or determine each of these conditions and may adjust the mirror head and/or reflective element accordingly, so as to provide enhanced viewability of the displayed information.

Optionally, the mirror assembly may include one or more displays, such as the types disclosed in U.S. Pat. Nos. 5,530,240 and/or 6,329,925, which are hereby incorporated herein by reference in their entireties, and/or display-on-demand transflective type displays, such as the types disclosed in U.S. Pat. Nos. 7,855,755; 7,626,749; 7,581,859; 7,338,177; 7,274,501; 7,255,451; 7,195,381; 7,184,190; 5,668,663; 5,724,187 and/or 6,690,268, and/or in U.S. patent application Ser. No. 11/226,628, filed Sep. 14, 2005 and published on Mar. 23, 2006 as U.S. Patent Publication No. 2006/0061008; and/or Ser. No. 10/538,724, filed Jun. 13, 2005 and published on Mar. 9, 2006 as U.S. Patent Publication No. 2006/0050018, which are all hereby incorporated herein by reference in their entireties, so that the displays are viewable through the reflective element, while the display area still functions to substantially reflect light, in order to provide a generally uniform prismatic reflective element even in the areas that have display elements positioned behind the reflective element. The thicknesses and materials of the coatings on the substrates, such as on the third surface of the reflective element assembly, may be selected to provide a desired color or tint to the mirror reflective element, such as a blue colored reflector, such as is known in the art and such as described in U.S. Pat. Nos. 5,910,854; 6,420,036 and/or 7,274,501, which are all hereby incorporated herein by reference in their entireties.

Optionally, a display and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and 6,124,886, and/or U.S. patent application Ser. No. 10/538,724, filed Jun. 13, 2005 and published on Mar. 9, 2006 as U.S. Patent Publication No. 2006/0050018, which are hereby incorporated herein by reference in their entireties.

The display may comprise a video display and may utilize aspects of the video display devices or modules described in U.S. Pat. Nos. 6,690,268; 7,184,190; 7,274,501; 7,370,983 and/or 7,446,650, and/or U.S. patent application Ser. No. 12/091,525, filed Apr. 25, 2008, now U.S. Pat. No. 7,855,755; and/or Ser. No. 10/538,724, filed Jun. 13, 2005 and published on Mar. 9, 2006 as U.S. Patent Publication No. 2006/0050018, which are all hereby incorporated herein by reference in their entireties. The video display may be operable to display images captured by one or more imaging sensors or cameras at the vehicle. The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454 and 6,824,281, which are all hereby incorporated herein by reference in their entireties. The camera or camera module may comprise any suitable camera or imaging sensor, and may utilize aspects of the cameras or sensors described in U.S. patent application Ser. No. 12/091,359, filed Apr. 24, 2008 and published on Oct. 1, 2009 as U.S. Patent No. 2009/0244361; and/or Ser. No. 10/534,632, filed May 11, 2005, now U.S. Pat. No. 7,965,336; and/or U.S. Pat. No. 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577 and 7,004,606; and/or U.S. patent application Ser. No. 11/315,675, filed Dec. 22, 2005 and published Aug. 17, 2006 as U.S. Patent Publication No. US-2006-0184297A1, now U.S. Pat. No. 7,720,580, and/or U.S. patent application Ser. No. 10/534,632, filed May 11, 2005 and published Aug. 3, 2006, now U.S. Pat. No. 7,965,336; and/or PCT Application No. PCT/US2008/076022, filed Sep. 11, 2008, and/or PCT Application No. PCT/US2008/078700, filed Oct. 3, 2008, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, and/or U.S. provisional application Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983; and/or U.S. patent application Ser. No. 10/538,724, filed Jun. 13, 2005 and published Mar. 9, 2006 as U.S. Publication No. US-2006-0050018-A1 and published on Mar. 9, 2006 as U.S. Patent Publication No. 2006/0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the display may operate to display video images captured by a plurality of exterior facing cameras of the vehicle, such as a rearward facing camera, a forward facing camera and a pair of opposite sideward facing cameras. Such a surround vision system may operate to receive video feeds from multiple cameras at the equipped vehicle (such as a rearward facing camera at the rear of the vehicle, one or more forward facing cameras at the front of the vehicle (such as at the front fender or bumper of the vehicle) and one or more sideward facing cameras at each of the sides of the vehicle, such as at the side exterior rearview mirror assemblies of the vehicle) and may process the video image data and seamlessly merge the image data or images in the multiple video feeds to generate, for display on a single video display screen, a surround view or top-view or panoramic view or "birds-eye" view of the area at and around the equipped vehicle, such as by utilizing aspects of the vision systems described in SAE Technical Paper 1999-01-0655, titled "Panoramic Electronic Rear Vision for Automotive Applications", published Mar. 1, 1999 by Rich Hicks, Ken Schofield, Paul Tarno and Mike Veiseh, and/or U.S. patent application Ser. No. 12/508,840, filed Jul. 24, 2009, and published Jan. 28, 2010 as U.S. Pat. Publication No. US 2010-0020170, and/or U.S. Pat. Nos. 7,782,374; 7,592,928; 7,161,616; 7,145,519; 6,498,620 and/or 5,670,935, and/or PCT Application No. PCT/US10/47256, filed Aug. 31, 2010 and published on Mar. 1, 2011 as International Publication No. WO 2011/028686, and/or U.S. provisional application Ser. No. 61/426,328, filed Dec. 22, 2010, which are hereby incorporated herein by reference in their entireties.

Optionally, the video processor may generate graphic overlays and/or indicia and/or visual aids to assist the driver's interpretation and use of the surround view or similar image displayed on the single video display (preferably this is a video mirror display such as described in U.S. Pat. Nos. 5,416,313; 5,285,060; 6,690,268; 6,902,284; 7,184,190; 7,195,381; 7,255,451; 7,274,501; 7,338,177; 7,370,983; 7,490,007; 7,540,620 and/or 7,855,755, and/or U.S. patent application Ser. No. 10/538,724, filed Jun. 13, 2005 and published on Mar. 9, 2006 as U.S. Patent Publication No. 2006/0050018; and/or Ser. No. 12/578,732, filed Oct. 14, 2009 and published on Apr. 22, 2010 as U.S. Patent No. 2010/0097469, which are all hereby incorporated herein by reference in their entireties, or the single video display may be a center stack or center console display or the like, such as is commonly used in navigation/infotainment systems). Optionally, an image processor or image processing capability/chip may be included in the video processor or video decoder chip, or may be provided as a separate chip or may be included in the likes of a rear backup camera package itself to provide a smart rear backup camera that not only captures video images but that local to and integrated with the backup camera assembly itself, image processes the captured video images for purposes of object detection, pedestrian detection, obstacle detection and the like, such as via the likes of an EyeQ2™ chip available from MobilEye of Jerusalem, Israel. The image processor so provided may be operable for machine vision analysis of the multiple video feeds/merged composite image so as to perform functions such as vehicle detection in the vicinity of the equipped vehicle, pedestrian detection in the vicinity of the equipped vehicle and/or object detection in the vicinity of the equipped vehicle. In the likes of a birds-eye or top-view surround vision display system, the video decoder (FIG. 13) may generate an iconistic or cartoon-like representation of the equipped vehicle in a central dead space of the displayed image, with the top-view/birds-eye view merged video images displayed therearound so that the driver of the equipped vehicle can readily discern the side views from the front and rear views and the rear view from the front view. The video processor may receive the video feeds from the multiple cameras via any link or communication means, such as via a twisted wire cable carrying standard video analog formats (such as NTSC or PAL or the like), or may receive digital signals such as via an LVDS protocol or an Ethernet protocol or via a MOST fiber optical link or the like. Optionally, and desirably, the intensity or brightness or contrast of the video display screen may be automatically adjusted in response to an ambient light sensor or glare detector, such as a sensor of the display screen device, such as a photosensor of the display screen device, or of the interior rearview mirror assembly or vehicle or of a console or module or the like, such as the types disclosed in U.S. Pat. Nos. 4,793,690 and/or 5,193,029, which are hereby incorporated herein by reference in their entireties.

Figure 11:
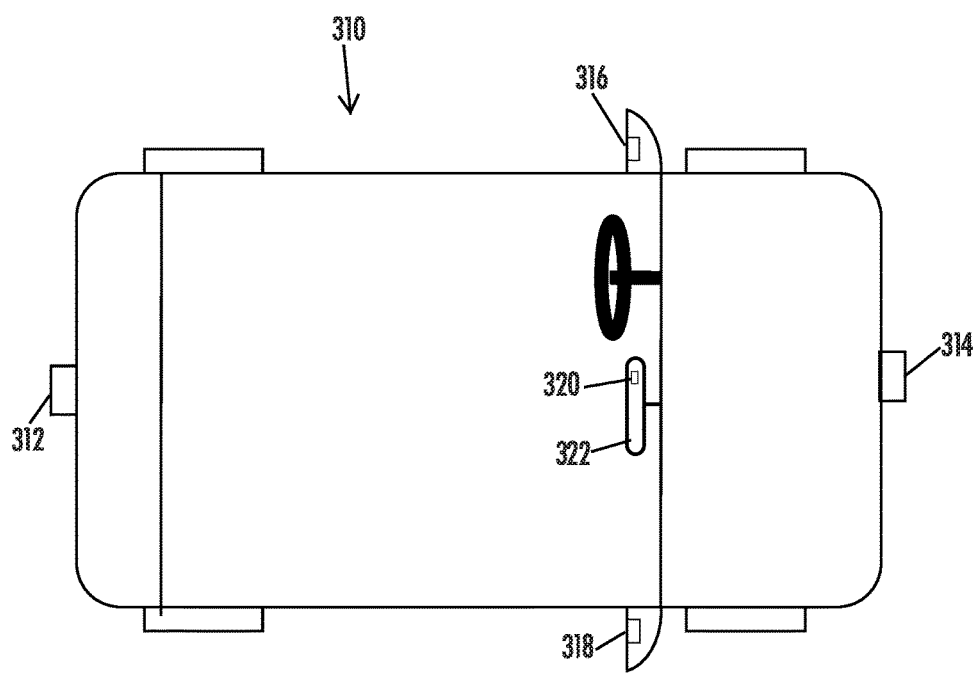
FIG. 11 is a plan view of a vehicle having a plurality of exterior facing or viewing cameras and a display screen in accordance with the present invention.

Optionally, and for example, with reference to FIG. 11, a vehicle 310 may include a rearward facing or viewing camera 312, a forward facing or viewing camera 314, a driver side camera 316 and a passenger side camera 318, and a video display 320 (such as a video display disposed at or near the interior rearview mirror assembly 322 of the vehicle) may be operable to display video images captured by one or more of the exterior facing or viewing cameras 312, 314, 316, 318. The display 320 may display a birds-eye view of the vehicle and/or may provide other display functions, such as video display of the images captured by the rear and/or side cameras, such as to assist the driver of the vehicle during a reversing maneuver of the vehicle.

Optionally, the captured images or image data captured by the exterior facing or viewing cameras may be processed to determine ambient and/or glare lighting at or around the vehicle, and an auto dimming function of a rearview mirror system of the vehicle may, responsive to image processing of the captured image data, control or adjust the dimming or darkening of the mirror reflective element of the interior rearview mirror assembly and/or exterior rearview mirror assemblies. The present invention thus provides for utilizing exterior facing/viewing cameras (implemented on the vehicle for video displays and the like) for glare sensing in cooperation with auto dimming mirrors. By using software to analyze the images captured by the exterior facing camera or cameras, decisions can be better made to dim each of the mirrors (for example, the interior rearview mirror, the driver side exterior rearview mirror and the passenger side exterior rearview mirror) independently without significant additional expense (since the cameras are already used on the vehicle for other applications). Optionally, the auto dimming function may utilize the rearward facing camera and may receive a signal indicative of the glare condition and/or ambient lighting condition at the rear of the vehicle and may adjust or control the dimming of one or more of the rearview mirrors accordingly. Optionally, the auto dimming function may utilize two or more of the exterior facing cameras (and optionally each of the exterior facing cameras may play a role in determining the ambient and/or glare lighting conditions at or around the vehicle), whereby the image data captured by each of the cameras may be processed to determine the lighting condition at or near that camera, and whereby the degree of dimming or darkening of one or more of the mirror reflective elements may be adjusted or controlled responsive to such image processing.

Optionally, the circuit board or chip may include circuitry for a camera or imaging array sensor and/or other electronic accessories or features, such as by utilizing compass-on-a-chip or EC driver-on-a-chip technology and aspects such as described in U.S. Pat. No. 7,255,451 and/or U.S. Pat. No. 7,480,149; and/or U.S. patent application Ser. No. 11/226,628, filed Sep. 14, 2005 and published on Mar. 23, 2006 as U.S. Patent Publication No. 2006/0061008; and/or Ser. No. 12/578,732, filed Oct. 14, 2009 and published on Apr. 22, 2010 as U.S. Patent No. 2010/0097469, which are hereby incorporated herein by reference in their entireties.

Optionally, the mirror assembly may include user inputs that may comprise buttons or switches for controlling or activating/deactivating one or more electrical accessories or devices of or associated with the mirror assembly. The mirror assembly may comprise any type of switches or buttons, such as touch or proximity sensing switches, such as touch or proximity switches of the types described above, or the inputs may comprise other types of buttons or switches, such as those described in U.S. Pat. Nos. 6,001,486; 6,310,611; 6,320,282; 6,627,918; 6,690,268; 7,224,324; 7,249,860; 7,253,723; 7,255,451; 7,360,932 and/or 7,446,924, and/or U.S. patent application Ser. No. 10/538,724, filed Jun. 13, 2005 and published on Mar. 9, 2006 as U.S. Patent Publication No. 2006/0050018, and/or U.S. patent application Ser. No. 12/576,550, filed Oct. 12, 2009, now U.S. Pat. No. 8,465,161, which are all hereby incorporated herein by reference in their entireties, or such as fabric-made position detectors, such as those described in U.S. Pat. Nos. 6,504,531; 6,501,465; 6,492,980; 6,452,479; 6,437,258 and 6,369,804, which are hereby incorporated herein by reference in their entireties.

Optionally, the user inputs or buttons may comprise user inputs for a garage door opening system, such as a vehicle based garage door opening system of the types described in U.S. Pat. Nos. 6,396,408; 6,362,771; 7,023,322 and 5,798,688, which are hereby incorporated herein by reference in their entireties. The user inputs may also or otherwise function to activate and deactivate a display or function or accessory, and/or may activate/deactivate and/or commence a calibration of a compass system of the mirror assembly and/or vehicle. The compass system may include compass sensors and circuitry within the mirror assembly or within a compass pod or module at or near or associated with the mirror assembly. Optionally, the user inputs may also or otherwise comprise user inputs for a telematics system of the vehicle, such as, for example, an ONSTAR® system as found in General Motors vehicles and/or such as described in U.S. Pat. Nos. 4,862,594; 4,937,945; 5,131,154; 5,255,442; 5,632,092; 5,798,688; 5,971,552; 5,924,212; 6,243,003; 6,278,377; 6,420,975; 6,477,464; 6,946,978; 7,308,341; 7,167,796; 7,004,593; 7,657,052 and/or 6,678,614, and/or U.S. patent application Ser. No. 10/538,724, filed Jun. 13, 2005 and published on Mar. 9, 2006 as U.S. Patent Publication No. 2006/0050018, which are all hereby incorporated herein by reference in their entireties.

Optionally, the mirror assembly may include one or more other accessories at or within the mirror casing or otherwise associated with or near the mirror assembly, such as one or more electrical or electronic devices or accessories, such as antennas, including global positioning system (GPS) or cellular phone antennas, such as disclosed in U.S. Pat. No. 5,971,552, a communication module, such as disclosed in U.S. Pat. No. 5,798,688, a blind spot detection system, such as disclosed in U.S. Pat. Nos. 5,929,786 and/or 5,786,772, transmitters and/or receivers, such as a garage door opener or the like, a digital network, such as described in U.S. Pat. No. 5,798,575, a high/low headlamp controller, such as disclosed in U.S. Pat. Nos. 5,796,094 and/or 5,715,093, a memory mirror system, such as disclosed in U.S. Pat. No. 5,796,176, a hands-free phone attachment, a video device for internal cabin surveillance and/or video telephone function, such as disclosed in U.S. Pat. Nos. 5,760,962 and/or 5,877,897, a remote keyless entry receiver, lights, such as map reading lights or one or more other lights or illumination sources, such as disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; 5,669,698; 7,195,381; 6,971,775; 7,657,052 and/or 7,249,860, microphones, such as disclosed in U.S. Pat. Nos. 6,243,003; 6,278,377 and/or 6,420,975, speakers, antennas, including global positioning system (GPS) or cellular phone antennas, such as disclosed in U.S. Pat. No. 5,971,552, a communication module, such as disclosed in U.S. Pat. No. 5,798,688, a voice recorder, a blind spot detection system, such as disclosed in U.S. Pat. Nos. 5,929,786; 5,786,772; 7,492,281; 7,038,577 and 6,882,287; and/or U.S. patent application Ser. No. 11/315,675, filed Dec. 22, 2005, now U.S. Pat. No. 7,720,580; and/or Ser. No. 12/446,507, filed Apr. 21, 2009, now U.S. Pat. No. 8,058,977, transmitters and/or receivers, such as for a garage door opener or a vehicle door unlocking system or the like (such as a remote keyless entry system), a digital network, such as described in U.S. Pat. No. 5,798,575, a high/low headlamp controller, such as a camera-based headlamp control, such as disclosed in U.S. Pat. Nos. 5,796,094 and/or 5,715,093, and/or U.S. patent application Ser. No. 12/781,119, filed May 17, 2010, a memory mirror system, such as disclosed in U.S. Pat. No. 5,796,176, a hands-free phone attachment, an imaging system or components or circuitry or display thereof, such as an imaging and/or display system of the types described in U.S. Pat. Nos. 7,881,496; 7,526,103; 7,400,435; 6,690,268 and 6,847,487, and/or U.S. patent application Ser. No. 12/508,840, filed Jul. 24, 2009 and published on Jan. 28, 2010 as U.S. Patent Publication No. 2010/0020170; Ser. No. 12/578,732, filed Oct. 14, 2009 and published on Apr. 22, 2010 as U.S. Patent No. 2010/0097469, an alert system, such as an alert system of the types described in PCT Application No. PCT/US2010/25545, filed Feb. 26, 2010 and published on Sep. 2, 2010 as International Publication No. WO 2010/099416, a video device for internal cabin surveillance (such as for sleep detection or driver drowsiness detection or the like) and/or video telephone function, such as disclosed in U.S. Pat. Nos. 5,760,962 and/or 5,877,897, a remote keyless entry receiver, a seat occupancy detector, a remote starter control, a yaw sensor, a clock, a carbon monoxide detector, status displays, such as displays that display a status of a door of the vehicle, a transmission selection (4wd/2wd or traction control (TCS) or the like), an antilock braking system, a road condition (that may warn the driver of icy road conditions) and/or the like, a trip computer, a tire pressure monitoring system (TPMS) receiver (such as described in U.S. Pat. Nos. 6,124,647; 6,294,989; 6,445,287; 6,472,979; 6,731,205 and/or 7,423,522, and/or an ONSTAR® system, a compass, such as disclosed in U.S. Pat. Nos. 5,924,212; 4,862,594; 4,937,945; 5,131,154; 5,255,442 and/or 5,632,092, and/or any other accessory or circuitry or the like (with the disclosures of the above-referenced patents and patent applications being hereby incorporated herein by reference in their entireties).

Changes and modifications to the specifically described embodiments may be carried out without departing from the principles of the present invention, which is intended to be limited only by the scope of the appended claims as interpreted according to the principles of patent law.

The invention claimed is:

1. An interior rearview mirror system for a vehicle, said interior rearview mirror system comprising:
   an interior rearview mirror assembly;
   said interior rearview mirror assembly comprising a mounting assembly configured for mounting at an interior portion of a vehicle equipped with said interior rearview mirror system;
   said interior rearview mirror assembly comprising a mirror head;
   wherein said mirror head is pivotally adjustable relative to said mounting assembly via a ball and socket joint;

said mirror head comprising a mirror reflective element and a video display screen;

said mirror reflective element comprising a transparent planar glass substrate coated at a surface thereof with a transflective mirror reflector that is partially transmissive of light therethrough and partially reflective of light incident thereon;

wherein said video display screen is disposed behind said transparent planar glass substrate of said mirror reflective element;

said mirror reflective element comprising an outermost bare glass surface that is closer than the transflective mirror reflector to a driver of the equipped vehicle with said interior rearview mirror assembly mounted at the interior portion of the equipped vehicle;

said interior rearview mirror assembly including a mechanism operable to change orientation of said outermost bare glass surface of said mirror reflective element relative to the driver of the equipped vehicle when the driver views said mirror reflective element with said interior rearview mirror assembly mounted at the interior portion of the equipped vehicle;

wherein, with said interior rearview mirror assembly mounted at the interior portion of the equipped vehicle, said mechanism is operable to change orientation of said outermost bare glass surface between a first position that is tilted towards the eyes of the driver of the equipped vehicle and a second position that is tilted away from the eyes of the driver of the equipped vehicle;

wherein, when said mechanism changes orientation of said outermost bare glass surface to said second position that is tilted away from the eyes of the driver of the equipped vehicle, said video display screen disposed behind the transflective mirror reflector displays video images viewable through the transflective mirror reflector of said mirror reflective element for viewing by the driver of the equipped vehicle; and wherein, when said mechanism changes orientation of said outermost bare glass surface to said first position that is tilted towards the eyes of the driver of the equipped vehicle, said video display screen disposed behind the transflective mirror reflector does not display video images viewable through the transflective mirror reflector of said mirror reflective element for viewing by the driver of the equipped vehicle and presence of said video display screen behind the transflective mirror reflector of said mirror reflective element is rendered covert by the transflective mirror reflector.

2. The interior rearview mirror system of claim 1, wherein the interior portion of the equipped vehicle comprises an in-cabin surface of a windshield of the equipped vehicle and wherein a mirror mounting button is adhered to the in-cabin surface of the windshield and wherein said mounting assembly comprises a portion configured for mounting to the mirror mounting button.

3. The interior rearview mirror system of claim 2, wherein said mounting assembly comprises a double ball mounting assembly.

4. The interior rearview mirror system of claim 1, wherein said mechanism is operable by the driver of the equipped vehicle to change orientation of said outermost bare glass surface of said mirror reflective element between said first position and said second position.

5. The interior rearview mirror system of claim 1, wherein said mechanism comprises an actuator operable to change orientation of said outermost bare glass surface of said mirror reflective element between said first position and said second position.

6. The interior rearview mirror system of claim 1, wherein said mechanism comprises a motor operable to change orientation of said outermost bare glass surface of said mirror reflective element between said first position and said second position.

7. The interior rearview mirror system of claim 1, wherein said mechanism comprises a toggle manually operable by the driver of the equipped vehicle to change orientation of said outermost bare glass surface of said mirror reflective element between said first position and said second position.

8. The interior rearview mirror system of claim 1, wherein, when orientation of said outermost bare glass surface is in said first position, line of sight for light reflected by said outermost bare glass surface meets the eyes of the driver of the equipped vehicle who is viewing said mirror reflective element, and wherein, when orientation of said outermost bare glass surface is in said second position, line of sight for light reflected by said outermost bare glass surface does not meet the eyes of the driver of the equipped vehicle who is viewing said mirror reflective element.

9. The interior rearview mirror system of claim 8, wherein said video images displayed by said video display screen are captured by a rearward viewing camera of the equipped vehicle.

10. The interior rearview mirror system of claim 9, wherein said mirror head comprises electrical circuitry and wherein video images captured by said rearward viewing camera are received at and are processed by said electrical circuitry for display by said video display screen.

11. The interior rearview mirror system of claim 10, wherein said electrical circuitry comprises a video decoder.

12. The interior rearview mirror system of claim 1, wherein said mirror head comprises a sensor and wherein said mechanism operates to change orientation of said mirror reflective element between said first position and said second position responsive to an output of said sensor.

13. The interior rearview mirror system of claim 12, wherein said sensor comprises a photosensor.

14. The interior rearview mirror system of claim 1, wherein said mirror reflective element comprises a prismatic mirror reflective element and wherein said transparent glass substrate comprises a prismatic glass substrate.

15. The interior rearview mirror system of claim 1, wherein said mirror reflective element comprises an electro-optic mirror reflective element.

16. The interior rearview mirror system of claim 15, wherein said electro-optic mirror reflective element comprises an electrochromic mirror reflective element.

17. The interior rearview mirror system of claim 15, wherein said mirror head comprises a touch sensor and wherein, responsive to touching of said touch sensor by the driver of the equipped vehicle, said mechanism changes orientation of said mirror reflective element from said first position to said second position for display by said video display screen of video images for viewing by the driver of the equipped vehicle.

18. An interior rearview mirror system for a vehicle, said interior rearview mirror system comprising:

an interior rearview mirror assembly;

said interior rearview mirror assembly comprising a mounting assembly configured for mounting at an interior portion of a vehicle equipped with said interior rearview mirror system;

wherein the interior portion of the equipped vehicle comprises an in-cabin surface of a windshield of the equipped vehicle and wherein a mirror mounting button is adhered to the in-cabin surface of the windshield and wherein said mounting assembly comprises a portion configured for mounting to the mirror mounting button;

said interior rearview mirror assembly comprising a mirror head;

wherein said mirror head is pivotally adjustable relative to said mounting assembly via a ball and socket joint;

said mirror head comprising a mirror reflective element and a video display screen;

wherein said mirror reflective element comprises an electrochromic mirror reflective element;

said electrochromic mirror reflective element comprising a transparent planar glass substrate coated at a surface thereof with a transflective mirror reflector that is partially transmissive of light therethrough and partially reflective of light incident thereon;

wherein said video display screen is disposed behind the transflective mirror reflector of said transparent planar glass substrate of said mirror reflective element;

said mirror reflective element comprising an outermost bare glass surface that is closer than the transflective mirror reflector to a driver of the equipped vehicle with said interior rearview mirror assembly mounted at the interior portion of the equipped vehicle;

said interior rearview mirror assembly including a mechanism operable to change orientation of said outermost bare glass surface of said mirror reflective element relative to the driver of the equipped vehicle when the driver views said mirror reflective element with said interior rearview mirror assembly mounted at the interior portion of the equipped vehicle;

wherein said mechanism operates to change orientation of said outermost bare glass surface of said mirror reflective element between a first position that is tilted towards the eyes of the driver of the equipped vehicle and a second position that is tilted away from the eyes of the driver of the equipped vehicle;

wherein, when said mechanism changes orientation of said outermost bare glass surface to said second position that is tilted away from the eyes of the driver of the equipped vehicle, said video display screen disposed behind the transflective mirror reflector displays video images viewable through the transflective mirror reflector of said mirror reflective element for viewing by the driver of the equipped vehicle; and wherein, when orientation of said outermost bare glass surface is in said first position, line of sight for light reflected by said outermost bare glass surface meets the eyes of the driver of the equipped vehicle who is viewing said mirror reflective element;

wherein, when orientation of said outermost bare glass surface is in said second position, line of sight for light reflected by said outermost bare glass surface does not meet the eyes of the driver of the equipped vehicle who is viewing said mirror reflective element;

wherein, when said mechanism changes orientation of said outermost bare glass surface to said first position that is tilted towards the eyes of the driver of the equipped vehicle, said video display screen disposed behind the transflective mirror reflector does not display video images viewable through the transflective mirror reflector of said mirror reflective element for viewing by the driver of the equipped vehicle and presence of said video display screen behind said mirror reflective element is rendered covert by the transflective mirror reflector;

wherein, when said mechanism changes orientation of said outermost bare glass surface to said second position that is tilted away from the eyes of the driver of the equipped vehicle, said video display screen disposed behind the transflective mirror reflector displays video images viewable through the transflective mirror reflector of said mirror reflective element for viewing by the driver of the equipped vehicle;

wherein said video images displayed by said video display screen are captured by a rearward viewing camera of the equipped vehicle; and wherein said mirror head comprises electrical circuitry and wherein video images captured by said rearward viewing camera are received at and are processed by said electrical circuitry for display by said video display screen.

19. The interior rearview mirror system of claim 18, wherein, when displaying said video images captured by said rearward viewing camera, said video display screen is backlit by a plurality of white light emitting light emitting diodes.

20. The interior rearview mirror system of claim 18, wherein said video images are provided from said rearward viewing camera to said electrical circuitry as digital signals.

21. The interior rearview mirror system of claim 18, wherein said mechanism comprises a motor operable to change orientation of said outermost bare glass surface of said mirror reflective element between said first position and said second position.

22. The interior rearview mirror system of claim 18, wherein said mechanism comprises a toggle manually operable by the driver of the equipped vehicle to change orientation of said outermost bare glass surface of said mirror reflective element between said first position and said second position.

23. The interior rearview mirror system of claim 18, wherein, when orientation of said outermost bare glass surface is in said second position, the line of sight for light reflected by said outermost bare glass surface extends towards a roof region of the equipped vehicle.

24. An interior rearview mirror system for a vehicle, said interior rearview mirror system comprising:

an interior rearview mirror assembly;

said interior rearview mirror assembly comprising a mounting assembly configured for mounting at an interior portion of a vehicle equipped with said interior rearview mirror system;

said interior rearview mirror assembly comprising a mirror head;

wherein said mirror head is pivotally adjustable relative to said mounting assembly via a ball and socket joint;

said mirror head comprising a mirror reflective element and a video display screen;

said mirror reflective element comprising a transparent planar glass substrate coated at a surface thereof with a transflective mirror reflector that is partially transmissive of light therethrough and partially reflective of light incident thereon;

wherein said video display screen is disposed behind the transflective mirror reflector of said transparent planar glass substrate of said mirror reflective element;

said mirror reflective element comprising an outermost bare glass surface that is closer than the transflective mirror reflector to a driver of the equipped vehicle with said interior rearview mirror assembly mounted at the interior portion of the equipped vehicle;

said interior rearview mirror assembly including a mechanism operable to change orientation of said outermost bare glass surface of said mirror reflective element relative to the driver of the equipped vehicle when the driver views said mirror reflective element with said interior rearview mirror assembly mounted at the interior portion of the equipped vehicle;

wherein said mechanism operates to change orientation of said outermost bare glass surface of said mirror reflective element between a first position that is tilted towards the eyes of the driver of the equipped vehicle and a second position that is tilted away from the eyes of the driver of the equipped vehicle;

wherein, when orientation of said outermost bare glass surface is in said first position, line of sight for light reflected by said outermost bare glass surface meets the eyes of the driver of the equipped vehicle who is viewing said mirror reflective element;

wherein, when orientation of said outermost bare glass surface is in said second position, line of sight for light reflected by said outermost bare glass surface does not meet the eyes of the driver of the equipped vehicle who is viewing said mirror reflective element;

wherein, when said mechanism changes orientation of said outermost bare glass surface to said second position that is tilted away from the eyes of the driver of the equipped vehicle, said video display screen disposed behind the transflective mirror reflector displays video images viewable through the transflective mirror reflector of said mirror reflective element for viewing by the driver of the equipped vehicle;

wherein, when said mechanism changes orientation of said outermost bare glass surface to said first position that is tilted towards the eyes of the driver of the equipped vehicle, said video display screen disposed behind the transflective mirror reflector does not display video images viewable through the transflective mirror reflector of said mirror reflective element for viewing by the driver of the equipped vehicle and presence of said video display screen behind the transflective mirror reflector of said mirror reflective element is rendered covert by the transflective mirror reflector; and wherein said mechanism is operable by the driver of the equipped vehicle to change orientation of said outermost bare glass surface of said mirror reflective element between said first position and said second position.

25. The interior rearview mirror system of claim 24, wherein said mechanism is manually operated by the driver of the equipped vehicle to change orientation of said outermost bare glass surface of said mirror reflective element between said first position and said second position.

26. The interior rearview mirror system of claim 24, wherein said mechanism comprises a motor operable to change orientation of said outermost bare glass surface of said mirror reflective element between said first position and said second position.

27. The interior rearview mirror system of claim 24, wherein, in said second position, the line of sight for light reflected by said outermost bare glass surface of said mirror reflective element extends towards a roof region of the equipped vehicle.

28. The interior rearview mirror system of claim 24, wherein said mirror head comprises electrical circuitry and wherein video images captured by a rearward viewing camera of the equipped vehicle are provided from said rearward viewing camera to said electrical circuitry as digital signals.

29. The interior rearview mirror system of claim 24, wherein said mirror reflective element comprises an electrochromic mirror reflective element and wherein, when displaying said video images, said video display screen is backlit by a plurality of white light emitting light emitting diodes.

30. The interior rearview mirror system of claim 29, wherein automatic dimming of said electrochromic mirror reflective element is controlled, at least in part, by ambient light detection by a camera of the equipped vehicle.

31. The interior rearview mirror system of claim 29, wherein the interior portion of the equipped vehicle comprises an in-cabin surface of a windshield of the equipped vehicle and wherein a mirror mounting button is adhered to the in-cabin surface of the windshield and wherein said mounting assembly comprises a portion configured for mounting to the mirror mounting button.

32. The interior rearview mirror system of claim 31, wherein, in said second position, the line of sight for light reflected by said outermost bare glass surface of said mirror reflective element extends towards a roof region of the equipped vehicle.

33. The interior rearview mirror system of claim 32, wherein said mechanism is manually operated by the driver of the equipped vehicle to change orientation of said outermost bare glass surface of said mirror reflective element between said first position and said second position.

34. The interior rearview mirror system of claim 32, wherein said mechanism comprises a motor operable to change orientation of said outermost bare glass surface of said mirror reflective element between said first position and said second position.

35. The interior rearview mirror system of claim 32, wherein said mirror head comprises electrical circuitry and wherein video images captured by a rearward viewing camera of the equipped vehicle are received at and are processed by said electrical circuitry for display by said video display screen.

36. The interior rearview mirror system of claim 35, wherein said electrical circuitry comprises a video decoder.

37. The interior rearview mirror system of claim 24, wherein said mirror head comprises electrical circuitry and wherein video images captured by a rearward viewing camera of the equipped vehicle are received at and are processed by said electrical circuitry for display by said video display screen and wherein said electrical circuitry comprises a video decoder.

* * * * *